(12) United States Patent
Sakamoto et al.

(10) Patent No.: US 6,275,342 B1
(45) Date of Patent: Aug. 14, 2001

(54) ZOOM LENS SYSTEM

(75) Inventors: Keijiro Sakamoto, Okazaki; Kazuharu Kagoshima, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/020,570

(22) Filed: Jan. 27, 1998

(30) Foreign Application Priority Data

Jan. 30, 1997 (JP) .................................................. 9-016159

(51) Int. Cl.[7] .................................................. G02B 15/14

(52) U.S. Cl. .......................................... 359/691; 359/689

(58) Field of Search ...................................... 359/676–691

(56) References Cited

U.S. PATENT DOCUMENTS

| 5,619,381 | | 4/1997 | Anderson | 359/677 |
| 5,731,914 | * | 3/1998 | Meyers | 359/742 |
| 5,745,301 | * | 4/1998 | Betensky | 359/689 |
| 5,768,030 | * | 6/1998 | Estelle | 359/691 |

* cited by examiner

*Primary Examiner*—Georgia Epps
*Assistant Examiner*—Michael A Lucas
(74) *Attorney, Agent, or Firm*—Morrison & Foerster LLP

(57) ABSTRACT

A zoom lens system consists of, in order from the enlargement side to the reduction side, a first lens unit having a negative optical power and a second lens unit having a positive optical power. In the zoom lens system, either the first or the second lens unit has at least one surface having an optical power of diffraction.

5 Claims, 18 Drawing Sheets

FIG. 1
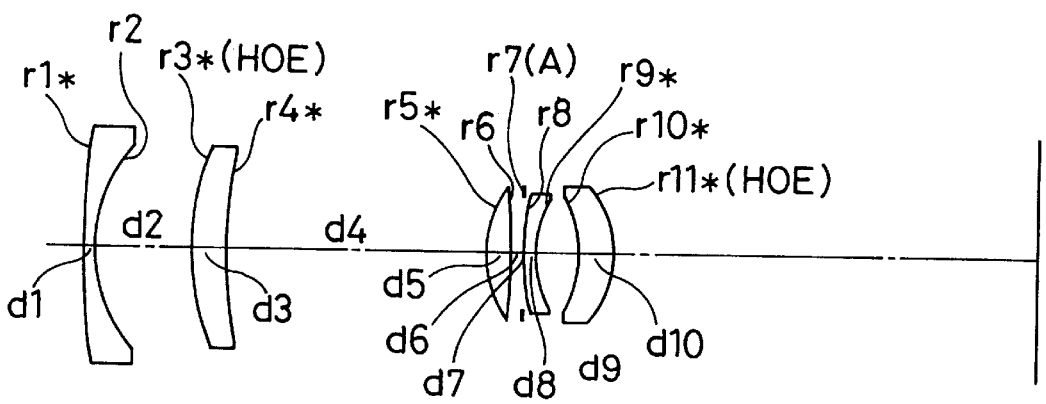
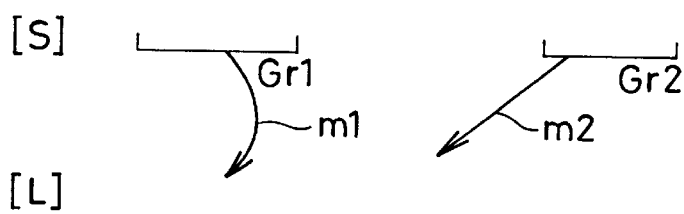
FIG. 2
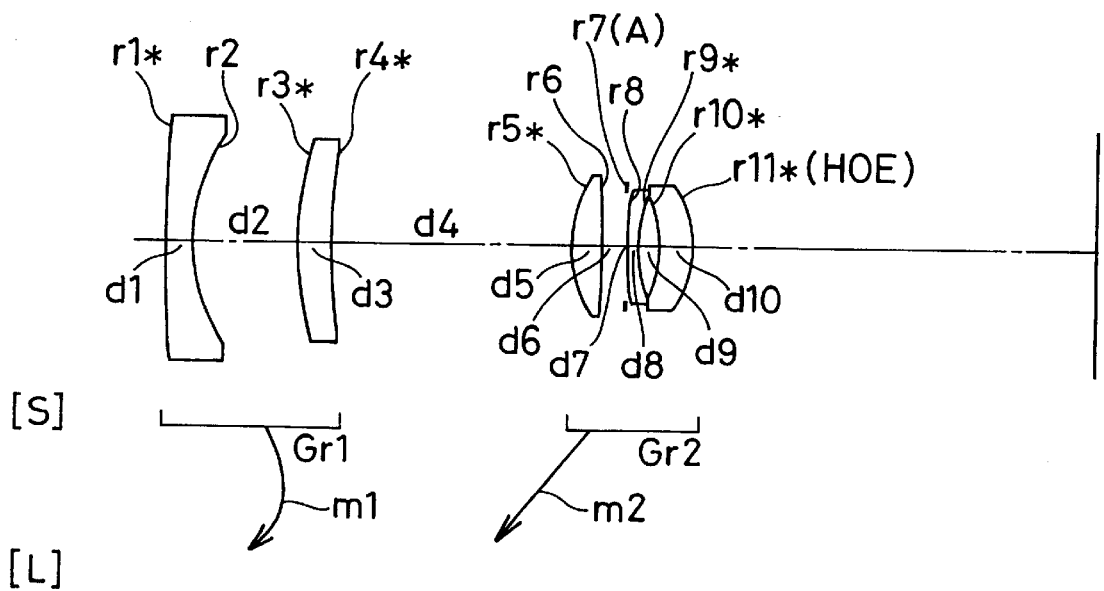
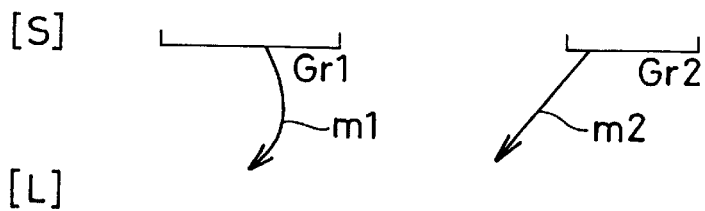

FIG. 3
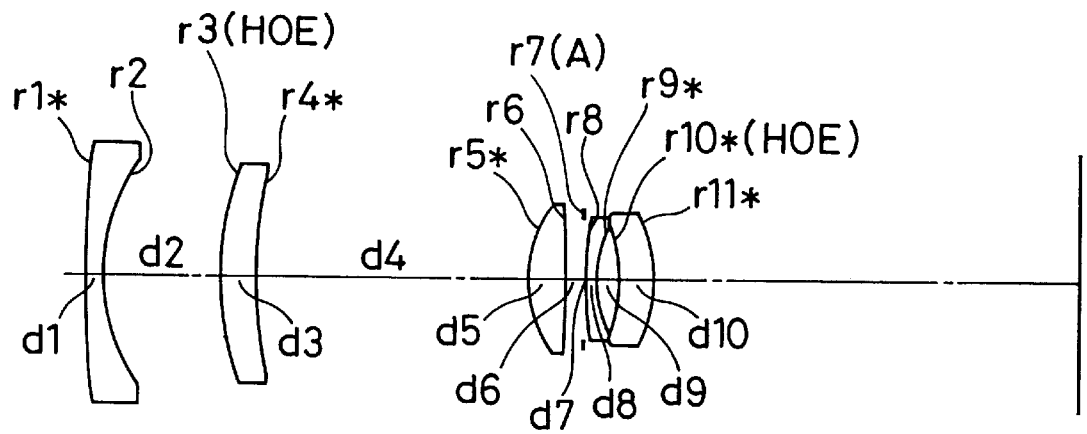
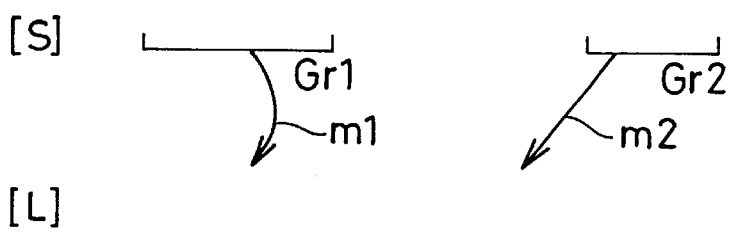
FIG. 4
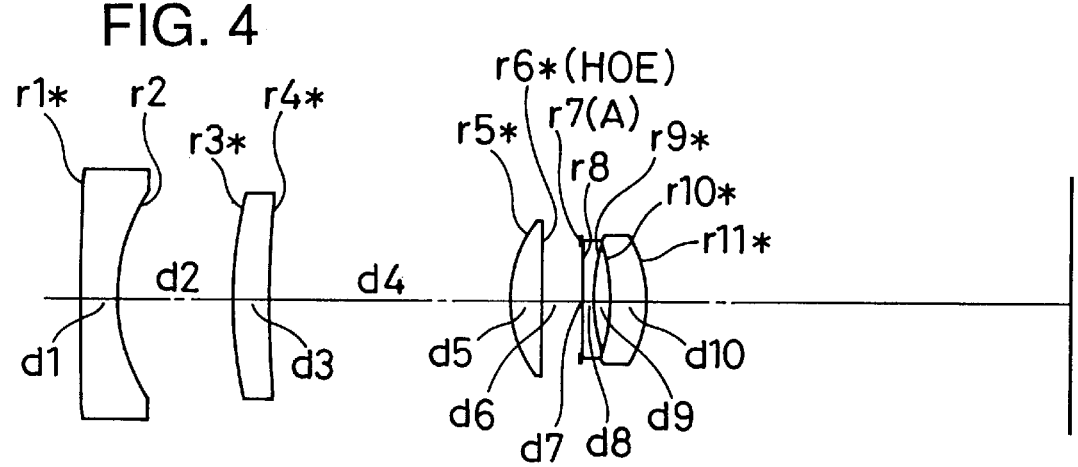
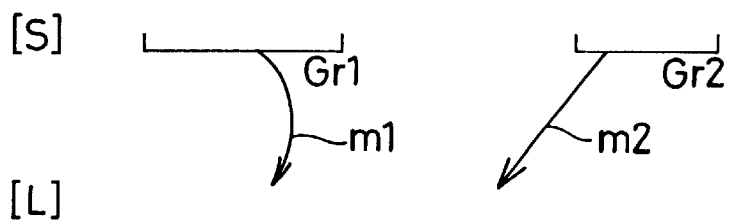

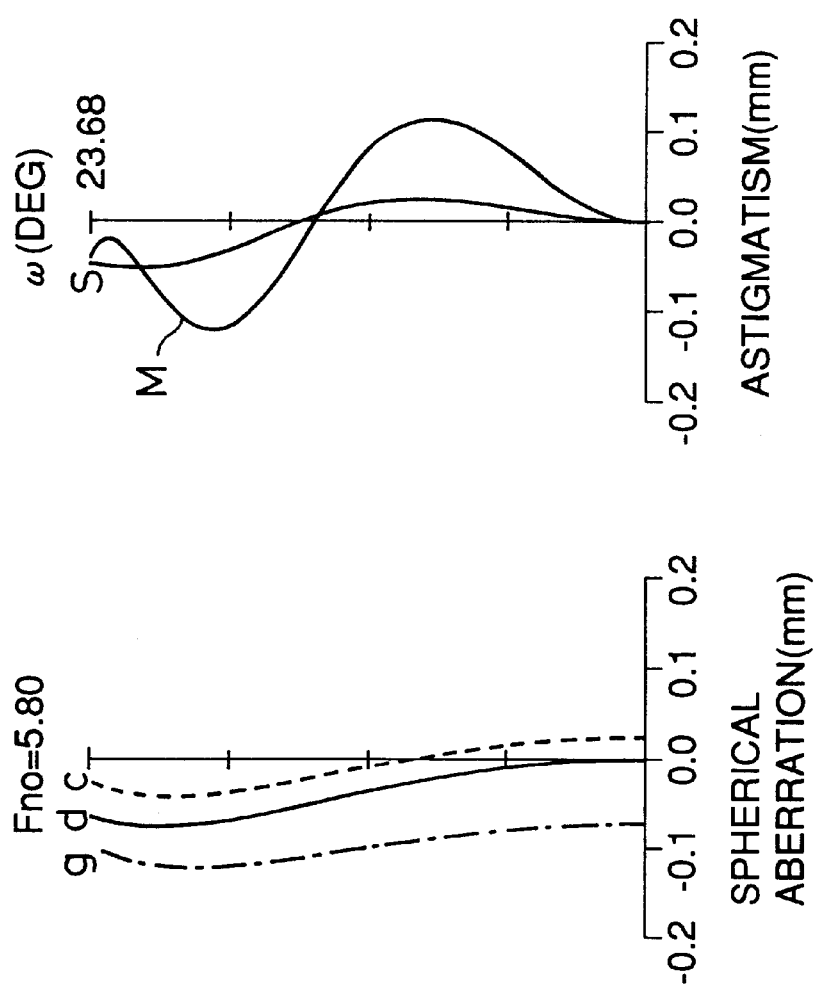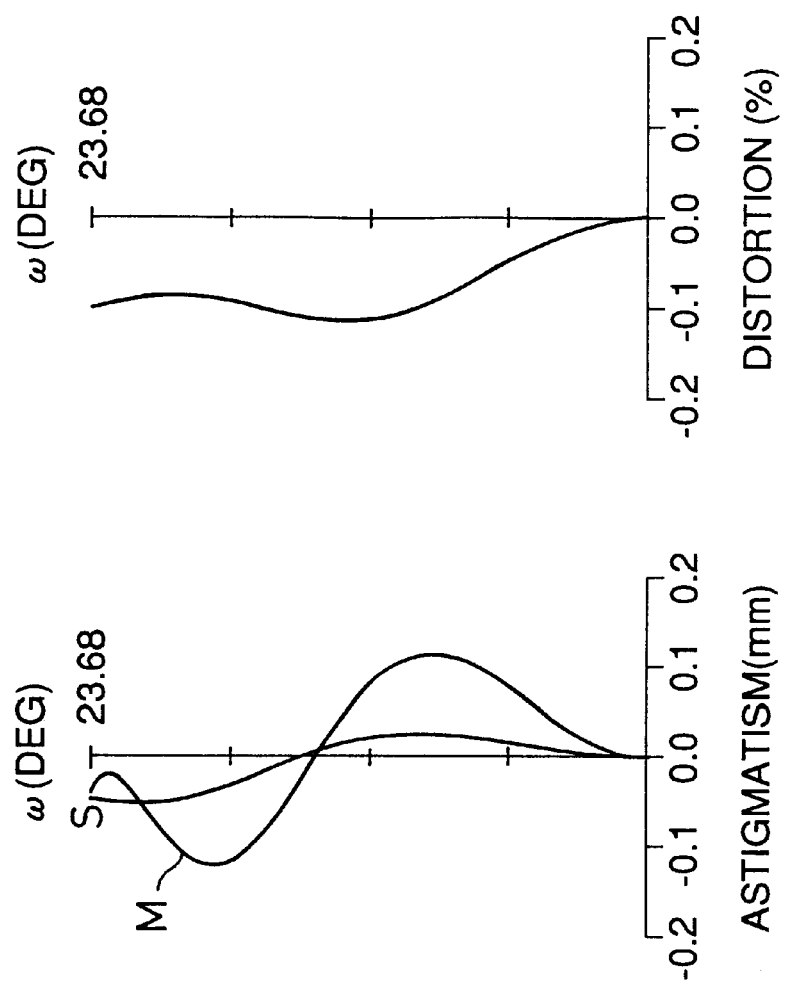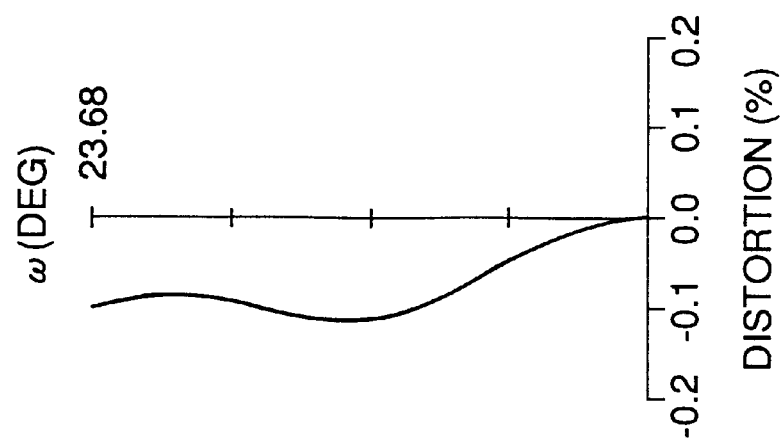

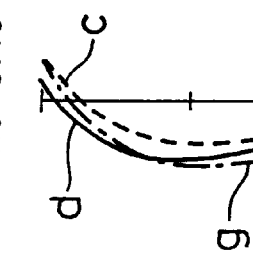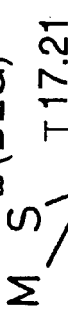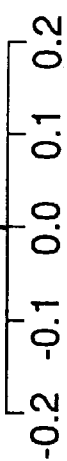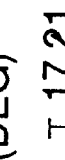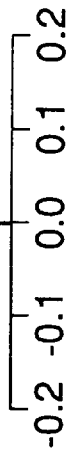

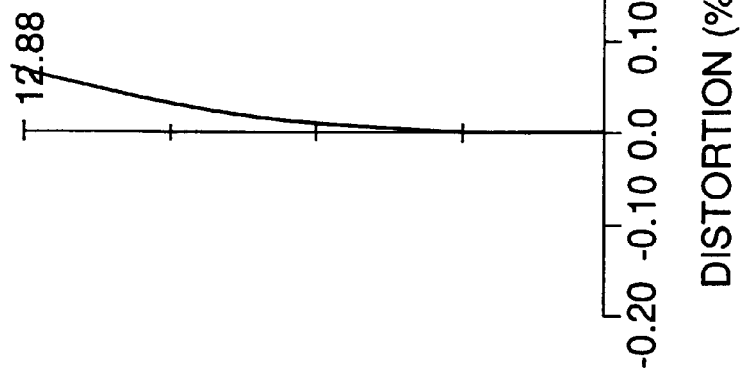
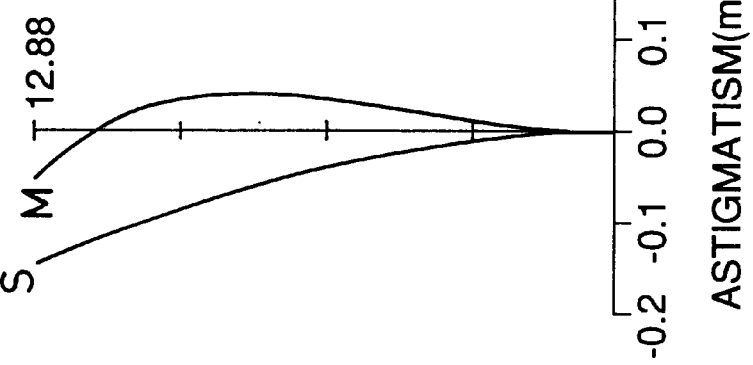
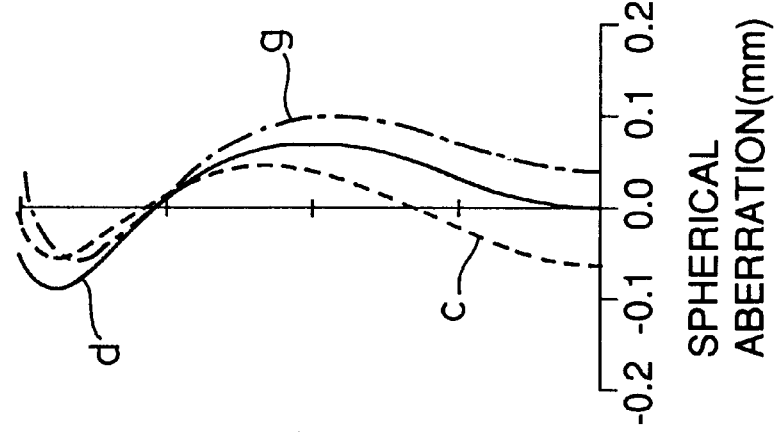

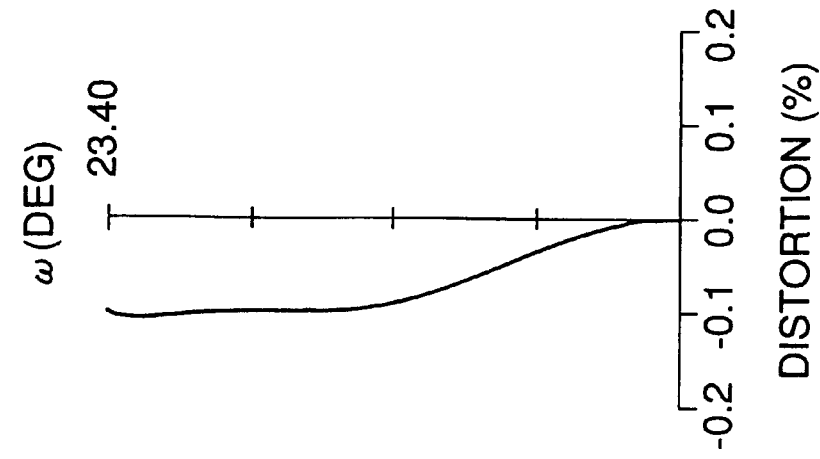
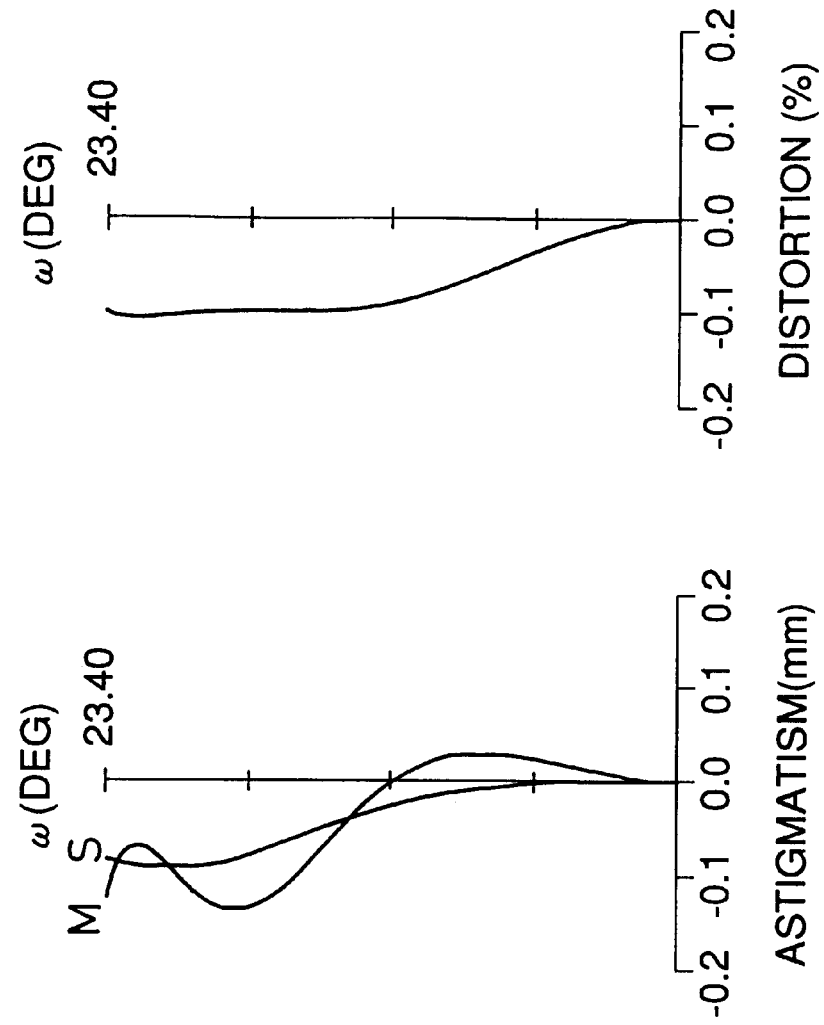
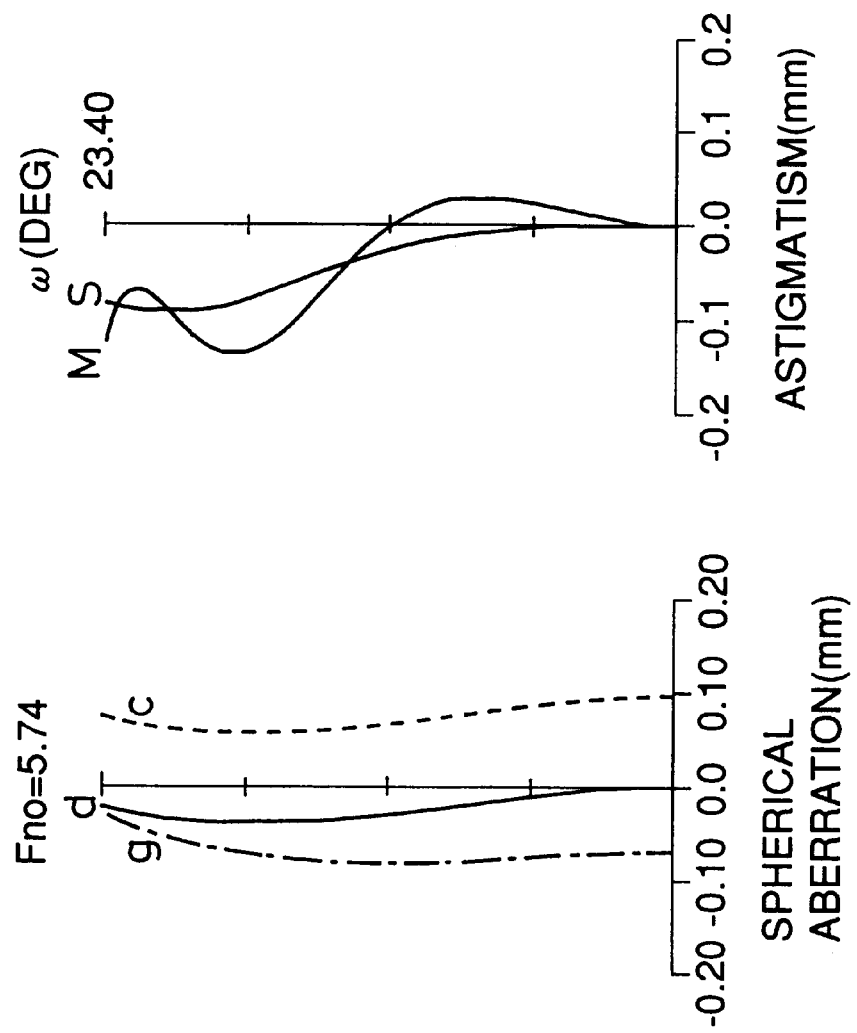

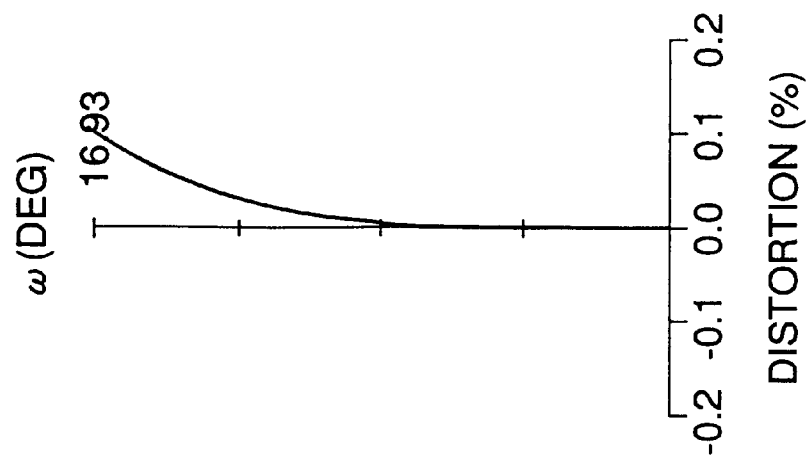
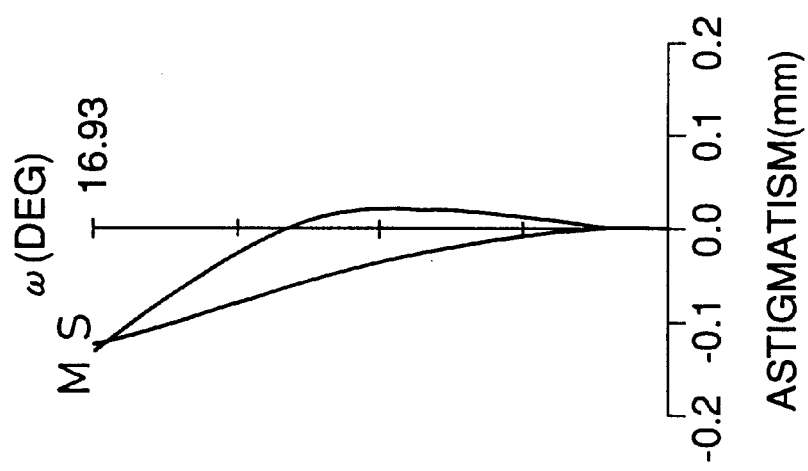
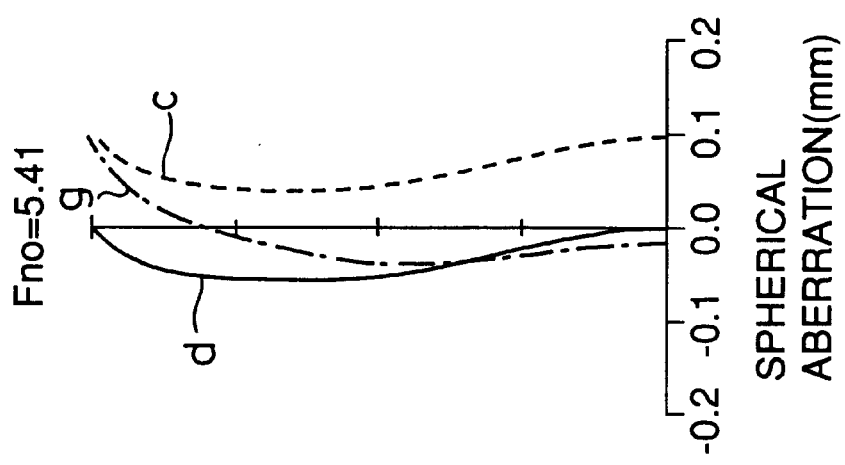

[S]

[M]

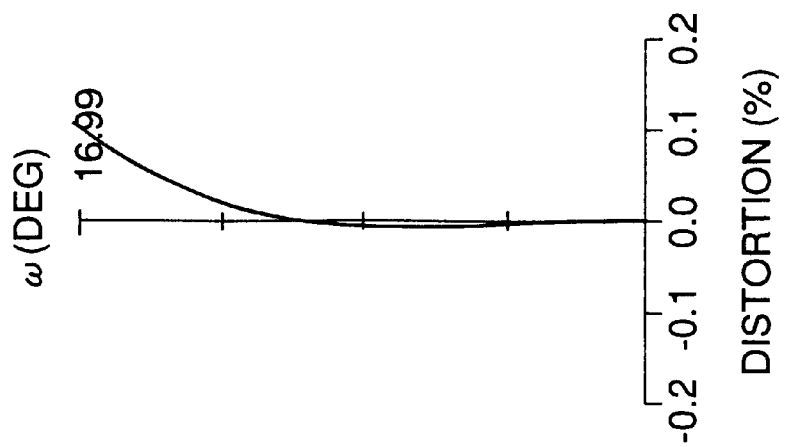
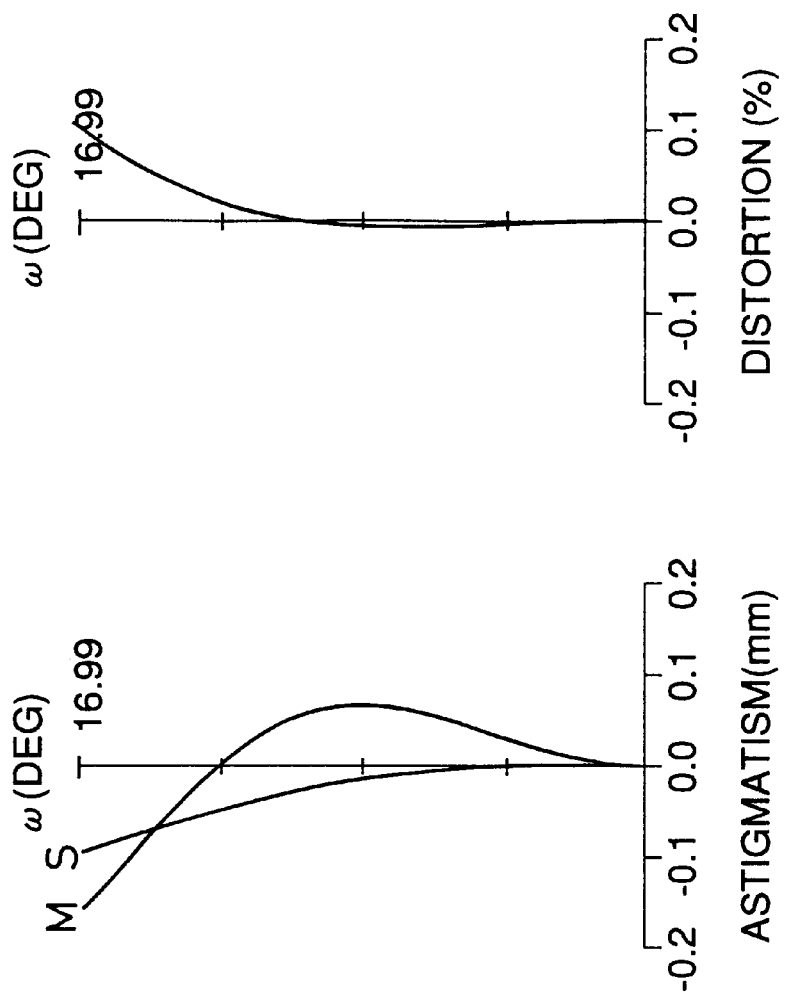
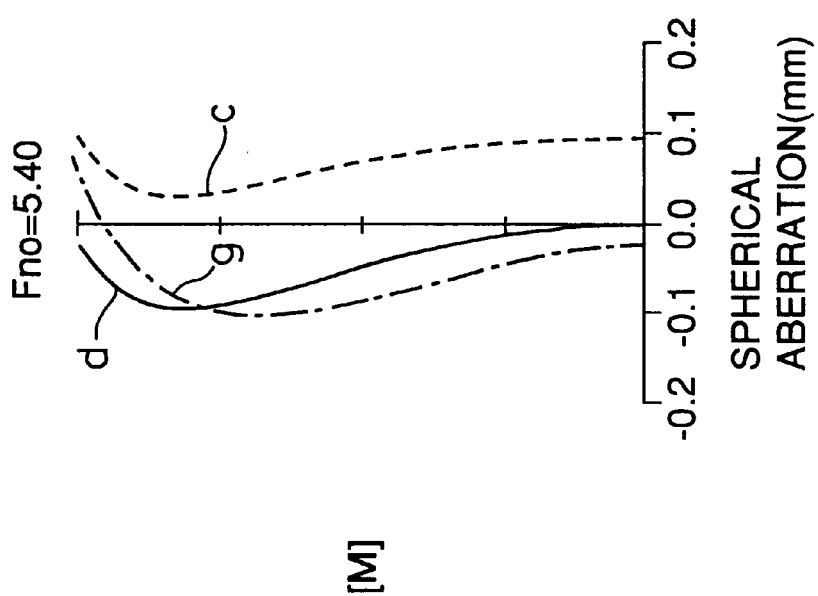
[M]

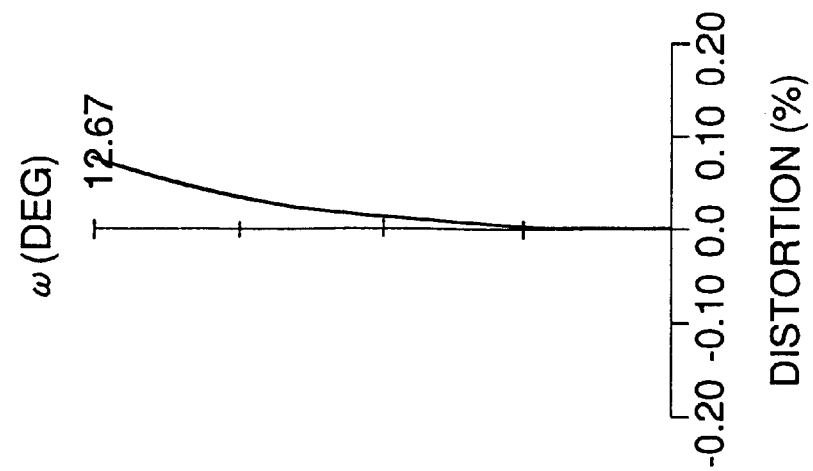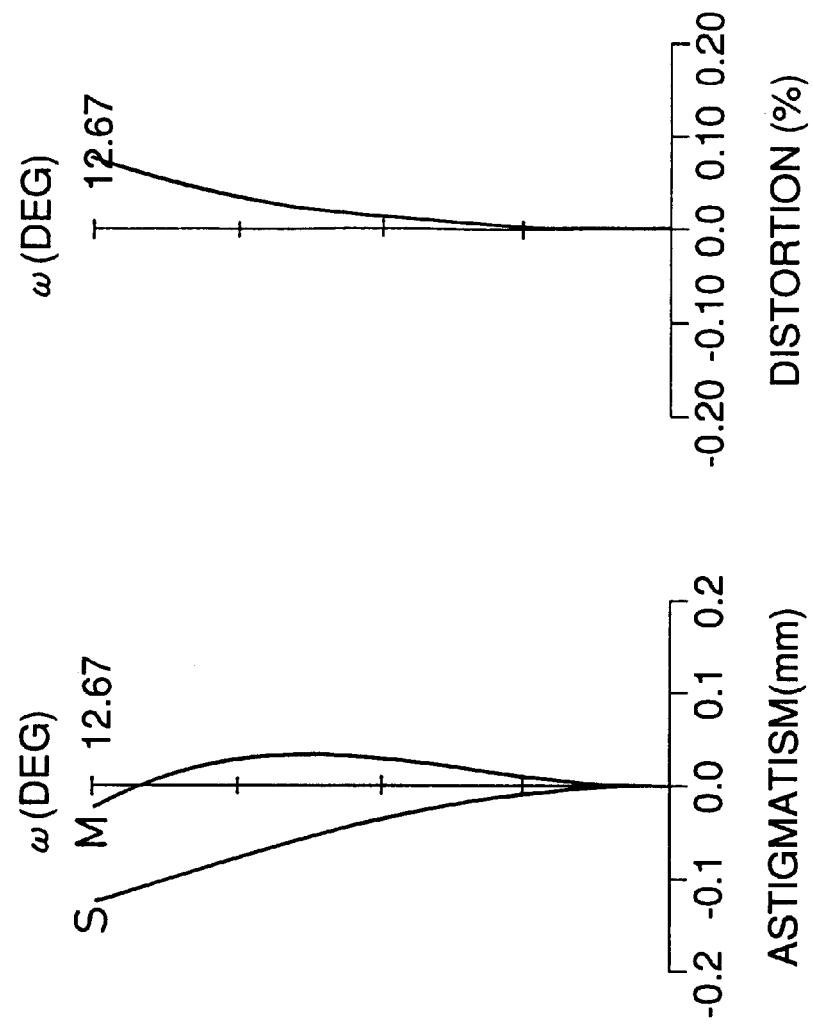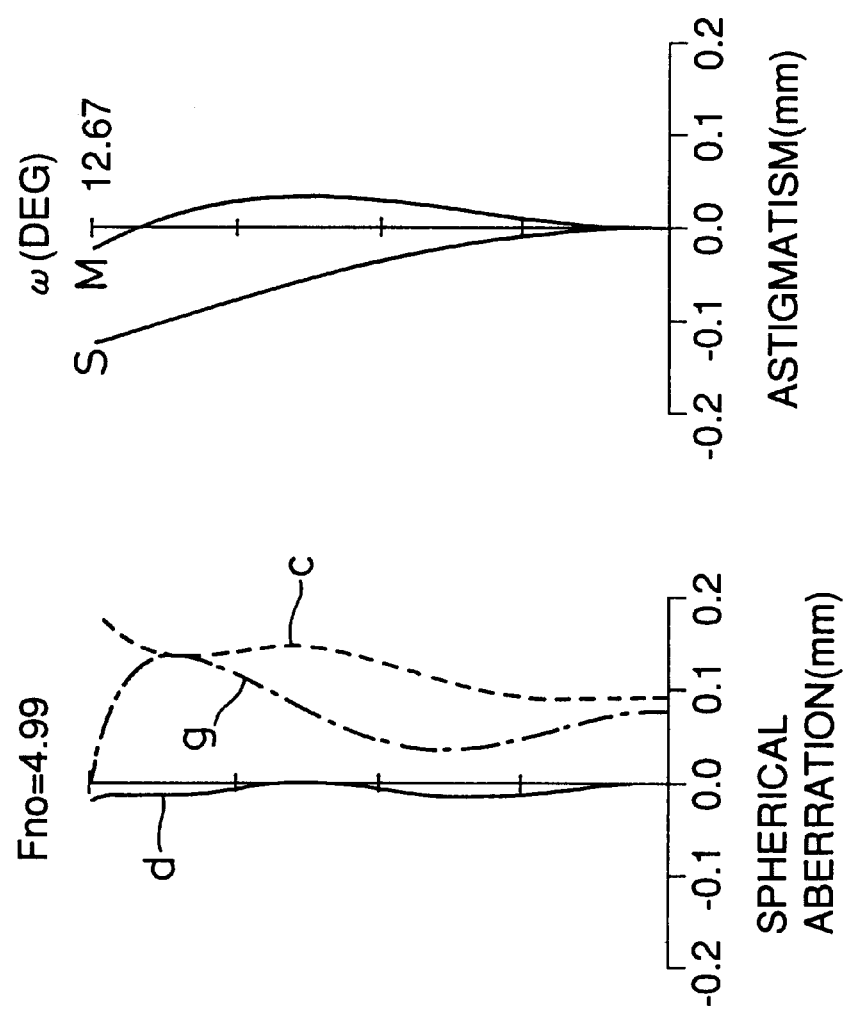

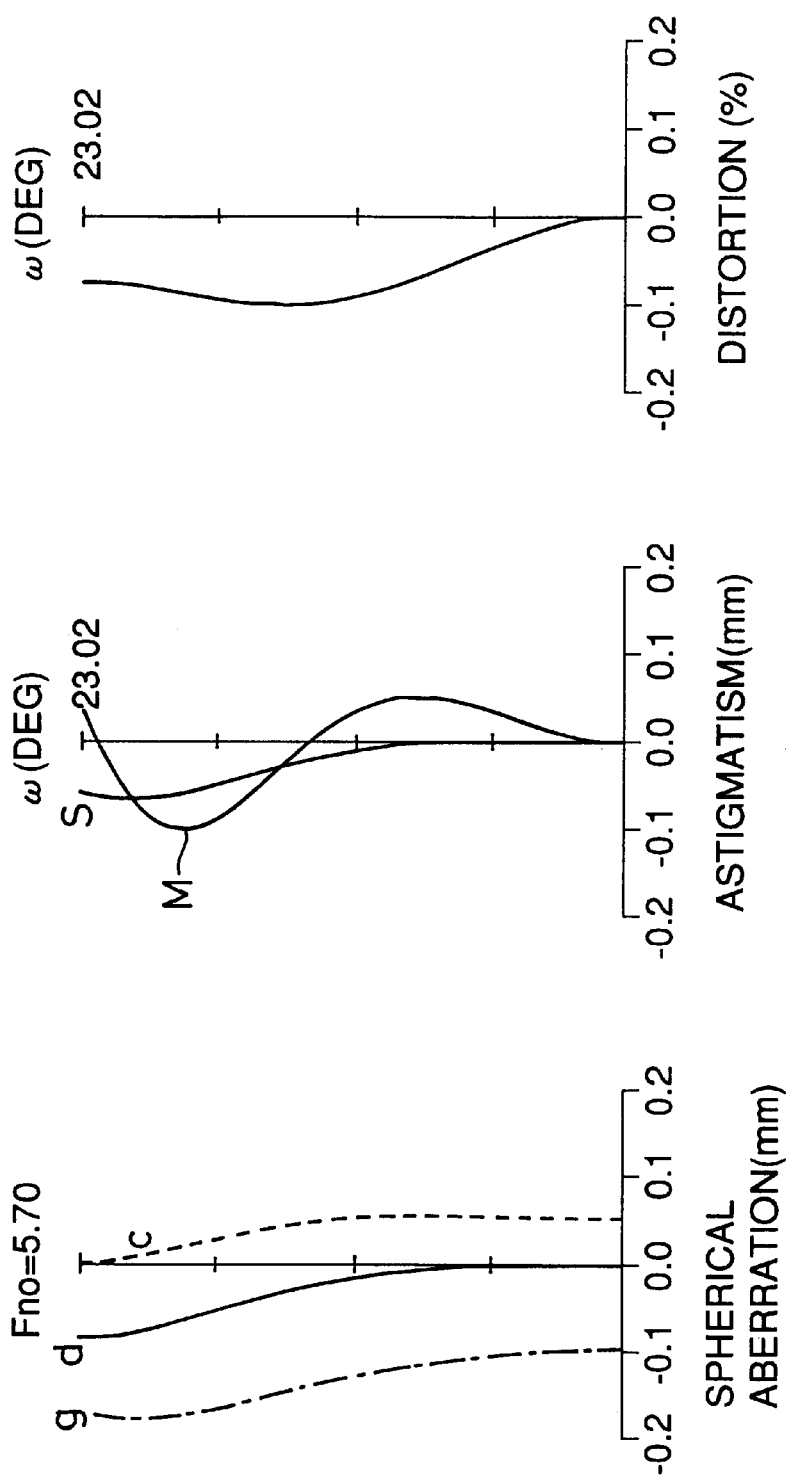

[M]

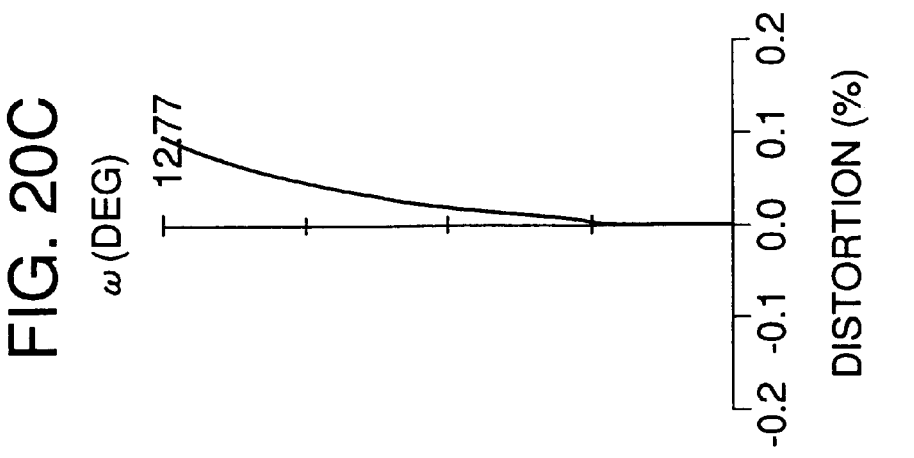
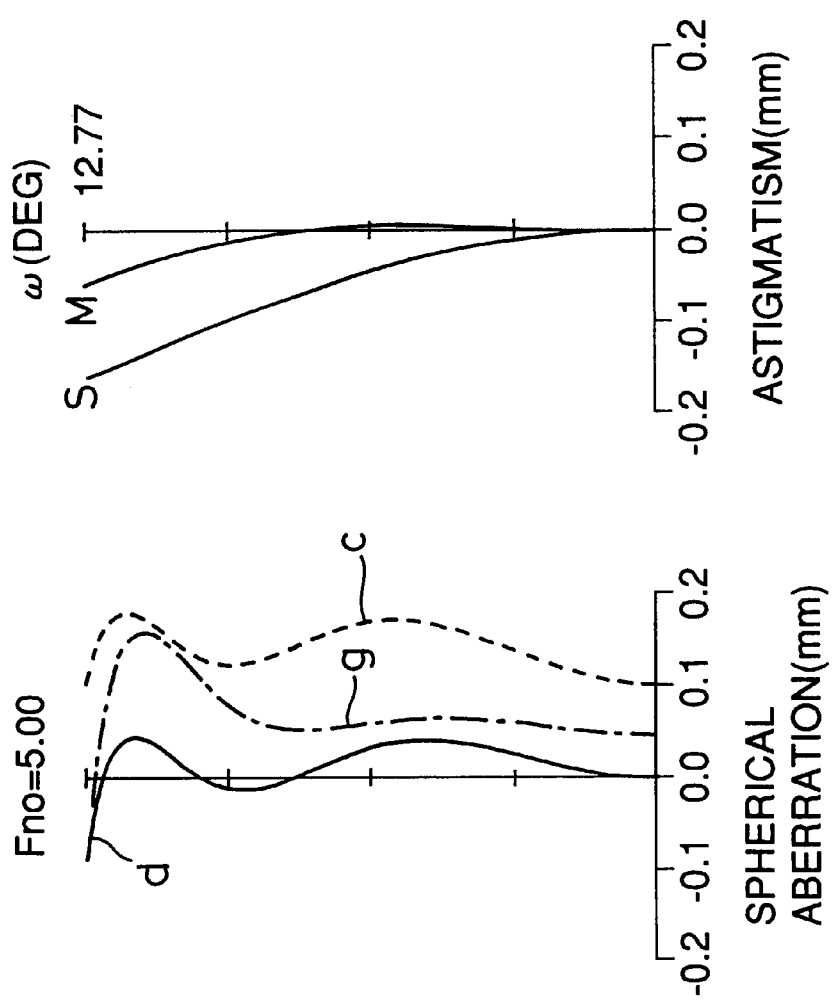

ZOOM LENS SYSTEM

BACKGROUND OF THE INVENTION

This application is based on application No. H09-016159 filed in Japan, the contents of which are hereby incorporated by reference.

1. Field of the Invention

The present invention relates to a zoom lens system, and more particularly to a zoom lens system for use as a high-resolution image-reading lens in, for example, an image-copying or image-reading apparatus.

2. Description of the Prior Art

Conventionally, image-copying or image-reading apparatuses typically employ a fixed focal length lens that offers a fixed reading magnification. Some lenses employed in such apparatuses are designed to offer variable reading magnification, though the range of magnification they offer is usually very limited. In such cases, magnification is varied either by an electrical means or by an optical means. For example, Japanese Laid-open Patent Applications Nos. H6-94993 and S57-73715 propose using a variable-focus lens as a means to vary magnification optically. On the other hand, increasing attention has recently been paid to the technique of properly correcting chromatic and other aberrations by combining an optical element having an optical power of diffraction with an optical element having an optical power of refraction. For example, Japanese Laid-open Patent Application No. H6-242373 and others propose an objective lens based on this principle for use in an optical disk apparatus.

However, the lenses proposed in the above-mentioned patent applications have the following disadvantages. In the variable-magnification image-reading lens proposed in Japanese Laid-open Patent Application No. H6-94993, the conjugate distance varies greatly, and therefore it is difficult to work out an appropriate mechanical design without making the lens unduly large. In the zoom lens system proposed in Japanese Laid-open Patent Application No. S57-73715, the conjugate distance is fixed, but each constituent lens element is considerably large and the lens system as a whole suffers from too large distortion and other aberrations to be used for high-resolution image-reading purposes. In the objective lens proposed in Japanese Laid-open Patent Application No. H6-242373 for use in an optical disk apparatus, aberrations are corrected only within a narrow band width, and therefore this lens is unfit for use in an optical system that employs a halogen lamp.

SUMMARY OF THE INVENTION

An object of the present invention is to provide a compact high-resolution zoom lens system that corrects chromatic and other aberrations satisfactorily.

To achieve the above object, according to one aspect of the present invention, a zoom lens system is provided with, in order from the enlargement side to the reduction side, a first lens unit having a negative optical power and a second lens unit having a positive optical power. In addition, in this zoom lens system, either the first or the second lens unit has at least one surface having an optical power of diffraction.

According to another aspect of the present invention, a finite distance zoom lens system is provided with, in order from the enlargement side to the reduction side, a first lens unit having a negative optical power and a second lens unit having a positive optical power. In addition, in this zoom lens system, either the first or the second lens unit has at least one surface having an optical power of diffraction.

BRIEF DESCRIPTION OF THE DRAWINGS

This and other objects and features of this invention will become clear from the following description, taken in conjunction with the preferred embodiments with reference to the accompanied drawings in which:

FIG. 1 is a diagram showing the lens arrangement of the zoom lens system of a first embodiment of the invention;

FIG. 2 is a diagram showing the lens arrangement of the zoom lens system of a second embodiment of the invention;

FIG. 3 is a diagram showing the lens arrangement of the zoom lens system of a third embodiment of the invention;

FIG. 4 is a diagram showing the lens arrangement of the zoom lens system of a fourth embodiment of the invention;

FIGS. 6A to 6C are diagrams showing the aberrations observed in the first embodiment, in the shortest focal length condition [S];

FIGS. 7A to 7C are diagrams showing the aberrations observed in the first embodiment, in the middle focal length condition [M];

FIGS. 8A to 8C are diagrams showing the aberrations observed in the first embodiment, in the longest focal length condition [L];

FIGS. 9A to 9C are diagrams showing the aberrations observed in the second embodiment, in the shortest focal length condition [S];

FIGS. 10A to 10C are diagrams showing the aberrations observed in the second embodiment, in the middle focal length condition [M];

FIGS. 16A to 16C are diagrams showing the aberrations observed in the fourth embodiment, in the middle focal length condition [M];

FIGS. 17A to 17C are diagrams showing the aberrations observed in the fourth embodiment, in the longest focal length condition [L];

FIGS. 18A to 18C are diagrams showing the aberrations observed in the fifth embodiment, in the shortest focal length condition [S];

FIGS. 20A to 20C are diagrams showing the aberrations observed in the fifth embodiment, in the longest focal length condition [L].

DESCRIPTION OF THE PREFERRED EMBODIMENTS

Hereinafter, zoom lens systems embodying the present invention will be described with reference to the drawings.

Figure 5:
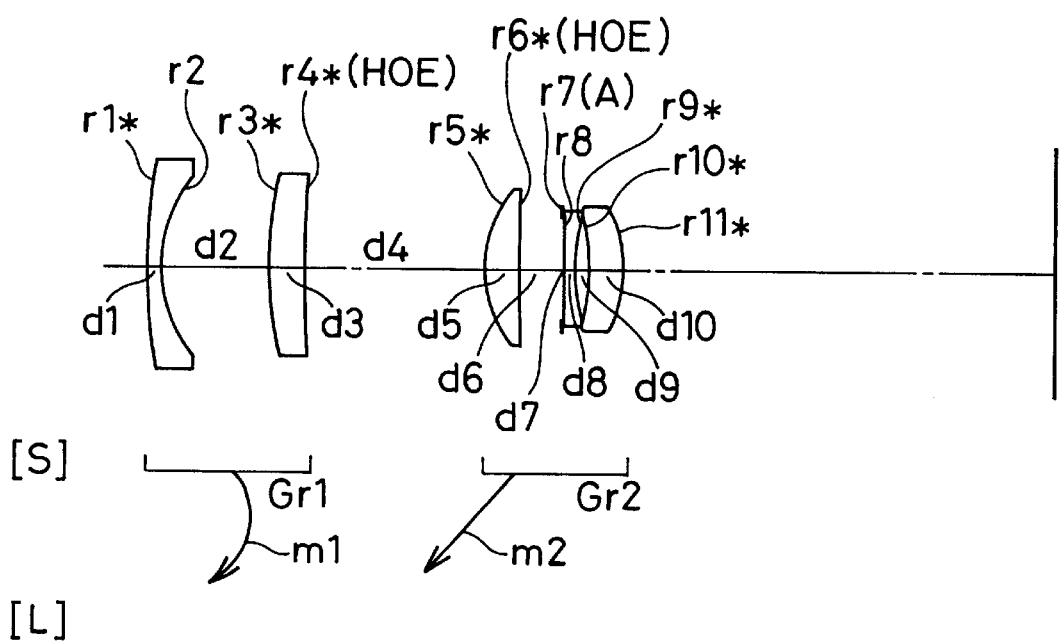
FIG. 5 is a diagram showing the lens arrangement of the zoom lens system of a fifth embodiment of the invention.

FIGS. 1 to 5 show the lens arrangement of the zoom lens systems of first to fifth embodiments, respectively, of the invention, each figure illustrating the lens arrangement in the shortest focal length condition [S]. In these lens arrangement diagrams, arrows m1 and m2 schematically show the movement of the first and second lens units Gr1 and Gr2, respectively, during zooming from the shortest focal length condition [S] to the longest focal length condition [L]; ri (i=1, 2, 3, . . . ) represents the ith surface from the enlargement side, and di (i=1, 2, 3, . . . ) represents the ith axial distance from the enlargement side; a surface ri marked with an asterisk (*) is an aspherical surface, and a surface ri marked with the symbol (HOE) is a surface having an optical power of diffraction.

The zoom lens systems of the first to fifth embodiments are each constituted of two zooming lens units, which are, from the enlargement side, a first lens unit Gr1 having a negative optical power and a second lens unit Gr2 having a positive optical power. In these zoom lens systems, zooming is performed by varying the distance d4 between the first and second lens units Gr1 and Gr2. All these zoom lens systems are designed for finite distances.

In the first, second, and third embodiments, the first lens unit Gr1 is composed of, from the enlargement side, a negative meniscus lens element having a highly concave surface on the reduction side and a positive meniscus lens element having a highly convex surface on the enlargement side; the second lens unit Gr2 is composed of, from the enlargement side, a positive biconvex lens element, an aperture diaphragm A, a negative meniscus lens element having a concave surface on the reduction side, and a positive meniscus lens element having a convex surface on the reduction side.

In the fourth embodiment, the first lens unit Gr1 is composed of, from the enlargement side, a negative biconcave lens element having a highly concave surface on the reduction side and a positive meniscus lens element having a highly convex surface on the enlargement side; the second lens unit Gr2 is composed of, from the enlargement side, a positive biconvex lens element, an aperture diaphragm A, a negative meniscus lens element having a concave surface on the reduction side, and a positive meniscus lens element having a convex surface on the reduction side.

In the fifth embodiment, the first lens unit Gr1 is composed of, from the enlargement side, a negative meniscus lens element having a highly concave surface on the reduction side and a positive meniscus lens element having a highly convex surface on the enlargement side; the second lens unit Gr2 is composed of, from the enlargement side, a positive biconvex lens element, an aperture diaphragm A, a negative biconcave lens element, and a positive meniscus lens element having a convex surface on the reduction side.

In each embodiment, the zoom lens system is provided with at least one surface having an optical power of diffraction; in other words, the zoom lens system has at least one lens surface where a surface having an optical power of diffraction is incorporated into a surface having an optical power of refraction. Specifically, in the first, third, and fifth embodiments, the first and second lens units Gr1 and Gr2 are each provided with one surface having an optical power of diffraction; in the second and fourth embodiments, the second lens unit Gr2 is provided with one surface having an optical power of diffraction.

A surface having an optical power of diffraction exhibits a negative dispersion as high as −3.45, which cannot be attained by the use of a common lens material. By exploiting this high dispersion principally for the correction of chromatic aberration, it is possible to reduce the number of lens elements required in each lens unit and thus make the entire lens system compact. In addition, it is possible to correct chromatic aberration within each lens unit and thus obtain a high-performance zoom lens system.

As described above, in each embodiment, the zoom lens system is constituted of two zooming lens units, that is, from the enlargement side, a negative and a positive lens unit, and one or both of those two lens units are provided with a surface having an optical power of diffraction. This makes it possible to correct chromatic and other aberrations satisfactorily with far fewer lens elements than ever, and thus to realize a compact, low-cost, and high-performance zoom lens system. For example, in the first, third, and fifth embodiments, a surface having an optical power of diffraction is provided in the first lens unit Gr1 having a negative optical power, so that the first lens unit Gr1 is made sufficiently achromatic to alleviate the burden on the second lens unit Gr2. This helps simplify the construction of the second lens unit Gr2. On the other hand, in the first to fifth embodiments, a surface having an optical power of diffraction is provided in the second lens unit Gr2 having a positive optical power, so that the second lens unit Gr2, which serves to achieve variable magnification, is made compact enough. This helps make the entire zoom lens system compact and enhance its optical performance.

In a zoom lens system in which, as in the first, third, and fifth embodiments, the first lens unit Gr1 is provided with a surface having an optical power of diffraction, it is preferable that the following condition (1) be fulfilled:

$$0.001 < |\phi Dn/\phi n| < 0.15 \tag{1}$$

where $\phi Dn$ represents the optical power of diffraction of the surface included in the first lens unit; and $\phi n$ An represents the composite optical power of refraction of all surfaces included in the first lens unit.

Condition (1) defines the optical power of diffraction of the surface provided in the first lens unit Gr1 having a negative optical power. If the upper limit of condition (1) is exceeded, the optical power of diffraction of this surface is too strong, with the result that chromatic aberration is overcorrected. By contrast, if the lower limit of condition (1) is exceeded, the optical power of diffraction of this surface is too weak, with the result that chromatic aberration is undercorrected.

Moreover, in a zoom lens system in which, as in the first, third, and fifth embodiments, the first lens unit Gr1 is provided with a surface having an optical power of diffraction, it is preferable that the following condition (2) be fulfilled:

$$|\phi Dn/\phi 1| < 0.07 \tag{2}$$

where $\phi 1$ represents the composite optical power of refraction and diffraction of the lens element which has the surface having an optical power of diffraction and which is included in the first lens unit.

Condition (2) defines the ratio of the optical power of diffraction of the surface provided in the first lens unit Gr1 having a negative optical power to the composite optical power of refraction and diffraction of the single lens element on which the surface having an optical power of diffraction is provided. If the upper limit of condition (2) is exceeded, the optical power of diffraction of this surface is too strong, with the result that, not only chromatic aberration, but also spherical aberration is overcorrected.

In a zoom lens system in which, as in the first to fifth embodiments, the second lens unit Gr2 is provided with a surface having an optical power of diffraction, it is preferable that the following condition (3) be fulfilled:

$$0.01 < \phi Dp/\phi p < 0.025 \qquad (3)$$

where $\phi Dp$ represents the optical power of diffraction of the surface included in the second lens unit; and $\phi p$ represents the composite optical power of refraction of all surfaces included in the second lens unit.

Condition (3) defines the optical power of diffraction of the surface provided in the second lens unit Gr2 having a positive optical power. If the upper limit of condition (3) is exceeded, the optical power of diffraction of this surface is too strong, with the result that chromatic aberration is undercorrected. By contrast, if the lower limit of condition (3) is exceeded, the optical power of diffraction of this surface is too weak, with the result that chromatic aberration is overcorrected.

Moreover, in a zoom lens system in which, as in the first to fifth embodiments, the second lens unit Gr2 is provided with a surface having an optical power of diffraction, it is preferable that the following condition (4) be fulfilled:

$$0.005 < \phi Dp/\phi 2 < 0.08 \qquad (4)$$

where $\phi 2$ represents the composite optical power of refraction and diffraction of the lens element which has the surface having an optical power of diffraction and which is included in the second lens unit.

Condition (4) defines the ratio of the optical power of diffraction of the surface provided in the second lens unit Gr2 having a positive optical power to the composite optical power of refraction and diffraction of the single lens element on which the surface having an optical power of diffraction is provided. If the upper limit of condition (4) is exceeded, the optical power of diffraction of this surface is too strong, with the result that chromatic aberration and spherical aberration are undercorrected. By contrast, if the lower limit of condition (4) is exceeded, the optical power of diffraction of this surface is too weak, with the result that chromatic aberration and spherical aberration are overcorrected.

In a zoom lens system which, like those of the first to fifth embodiments, consists of two, i.e. one negative and one positive, lens units and includes at least one surface having an optical power of diffraction, it is preferable that the first lens unit Gr1 include at least a negative lens element having a highly concave surface on the reduction side and a positive lens element having a highly convex surface on the enlargement side, and that the second lens unit Gr2 include at least one negative lens element and a positive meniscus lens element having a convex surface on the reduction side. In addition, in such a zoom lens system, it is preferable that the following condition (5) be fulfilled:

$$-0.7 < \phi p \cdot rL < -0.2 \qquad (5)$$

where $\phi p$ represents the composite optical power of refraction of all surfaces included in the second lens unit; and rL represents the radius of curvature of the most reduction-side convex surface of the zoom lens system.

Condition (5) defines the radius of curvature of the most reduction-side convex lens element within the second lens unit Gr2 having a positive optical power. If the upper limit of condition (5) is exceeded, large curvature of field appears and spherical aberration is overcorrected. By contrast, if the lower limit of condition (5) is exceeded, spherical aberration is undercorrected, and the entire zoom lens system is so long that it cannot be made sufficiently compact.

In a zoom lens system as described above, that is, in a zoom lens system which consists of two, i.e. one negative and one positive, lens units and includes at least one surface having an optical power of diffraction, wherein the first lens unit Gr1 includes at least a negative lens element having a highly concave surface on the reduction side and a positive lens element having a highly convex surface on the enlargement side, and wherein the second lens unit Gr2 includes at least one negative lens element and a positive meniscus lens element having a convex surface on the reduction side, it is preferable that the following condition (6) be fulfilled:

$$-1 < \phi n/\phi p < -0.5 \qquad (6)$$

where $\phi n$ represents the composite optical power of refraction of all surfaces included in the first lens unit; and $\phi p$ represents the composite optical power of refraction of all surfaces included in the second lens unit.

Condition (6) defines the ratio of the composite optical power of refraction of the first lens unit Gr1 to the composite optical power of refraction of the second lens unit Gr2. If the upper limit of condition (6) is exceeded, it is possible to reduce the optical power of refraction of each lens unit and thereby make correction of aberrations easier, but the entire zoom lens system is too long and the lens length varies too greatly as the magnification is varied. By contrast, if the lower limit of condition (6) is exceeded, it is possible to obtain a more compact zoom lens system, but the resulting zoom lens system suffers from large variations in coma aberration and distortion.

Tables 1 to 5 list the construction data of examples of the zoom lens systems of the first to fifth embodiments (FIGS. 1 to 5), respectively.

In the construction data of each embodiment, ri (i=1, 2, 3, . . . ) represents the radius of curvature of the ith surface from the enlargement side, and di (i=1, 2, 3, . . . ) represents the ith axial distance from the enlargement side. For the axial distance d4, which varies with zooming (i.e. a variable distance), three values are listed which are, from left, the axial distance between the two lens units in the shortest focal length condition [S], the same distance in the middle focal length condition [M], and the same distance in the longest focal length condition [L]. Ni (i=1, 2, 3, . . . ) and vi (i=1, 2, 3, . . . ) respectively represent the refractive index (Nd) and the Abbe number (vd) for d-line of the ith lens element from the enlargement side.

Also listed in the construction data are the focal lengths f and the f-numbers Fno of the entire zoom lens system in the shortest focal length condition [S], in the middle focal length condition [M], and in the longest focal length condition [L]. Table 6 lists the values corresponding to conditions (1) to (6) as observed in each embodiment. Note that, in each embodiment, the zoom lens system is assumed to be typically set to magnifications of −1/6.05x, −1/4.28x, and −1/3.03x in the shortest, middle, and longest focal length condition, respectively.

In the construction data of each embodiment, a surface whose radius of curvature ri is marked with an asterisk (*) is an aspherical surface. The surface shape of an aspherical surface is defined by the following formula (AS):

$$Z = \frac{C \cdot H^2}{1 + (1 - \varepsilon \cdot C^2 \cdot H^2)^{1/2}} + A1 \cdot H^4 + A2 \cdot H^6 + A3 \cdot H^8 + A4 \cdot H^{10} \quad \text{(AS)}$$

where

Z represents the displacement from the reference surface along the optical axis (note that, for a point having coordinates (X, Y, Z), $Z^2 = X^2 + Y^2$);

H represents the height in a direction perpendicular to the optical axis;

C represents the paraxial curvature;

$\varepsilon$ represents the quadric surface parameter (note that, in all embodiments of the present invention, $\varepsilon = 1$);

A1 represents the aspherical coefficient of the fourth order;

A2 represents the aspherical coefficient of the sixth order;

A3 represents the aspherical coefficient of the eighth order; and

A4 represents the aspherical coefficient of the tenth order.

In the construction data of each embodiment, a surface whose radius of curvature ri is marked with the symbol (H0E) is a surface where a surface having an optical power of diffraction is formed on a surface having an optical power of refraction. The pitch of a surface having an optical power of diffraction depends on its phase shape, which is defined by the following formula (DS):

$$\psi(H) = (2\pi/\lambda 0) \cdot (B1 \cdot H^2 + B2 \cdot H^4 + B3 \cdot H^6 + B4 \cdot H^8) \quad \text{(DS)}$$

where $\psi(H)$ represents the phase function of the surface having an optical power of diffraction;

H represents the height in a direction perpendicular to the optical axis:

B1 represents the phase function coefficient of the second order;

B2 represents the phase function coefficient of the fourth order;

B3 represents the phase function coefficient of the sixth order;

B4 represents the phase function coefficient of the eighth order; and $\lambda 0$ represents the design center wavelength (=587.56 nm, i.e. the wavelength of d-line).

Figure 11C:
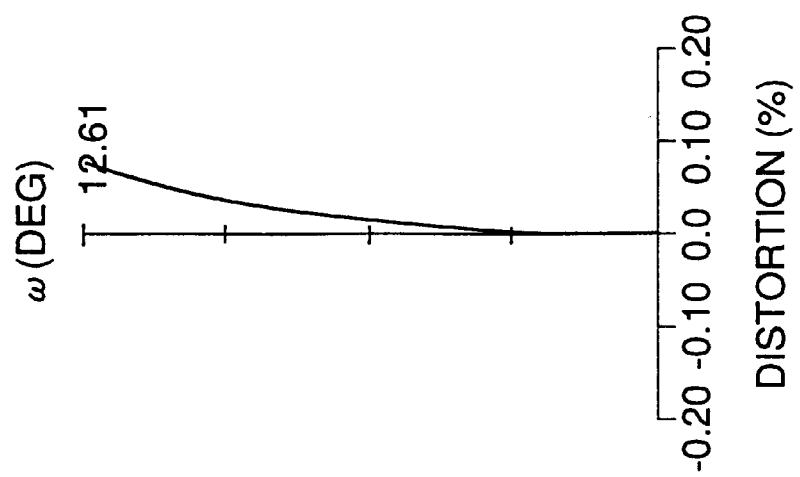
FIGS. 11A to 11C are diagrams showing the aberrations observed in the second embodiment, in the longest focal length condition [L]
Figure 11B:
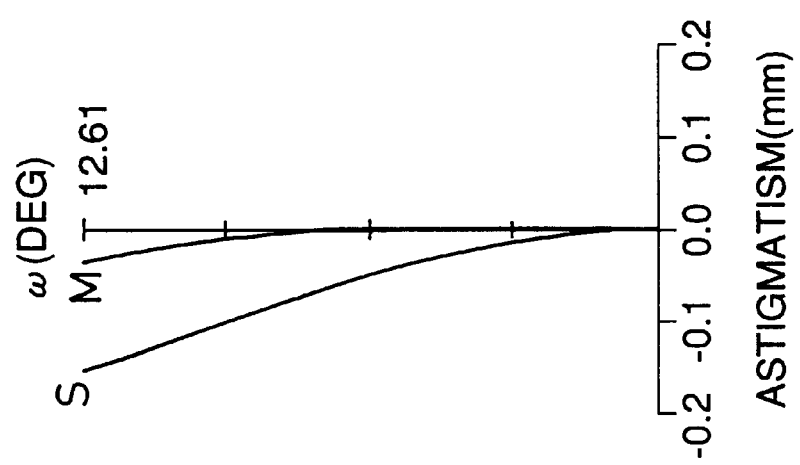
Figure 11A:
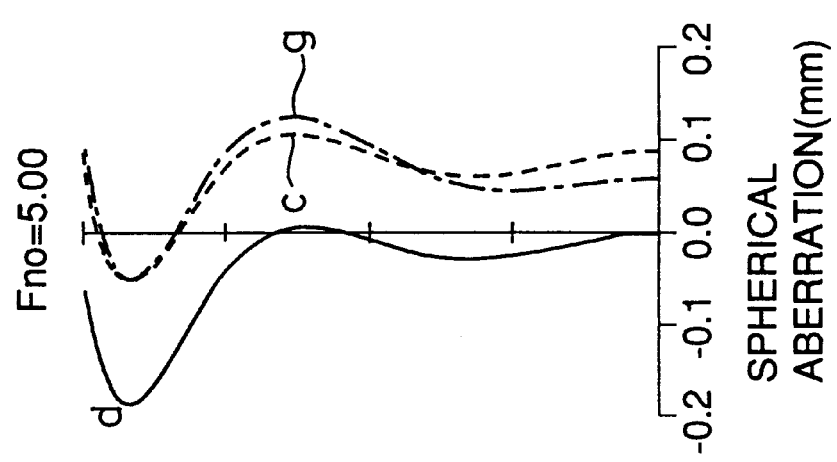
Figure 12C:
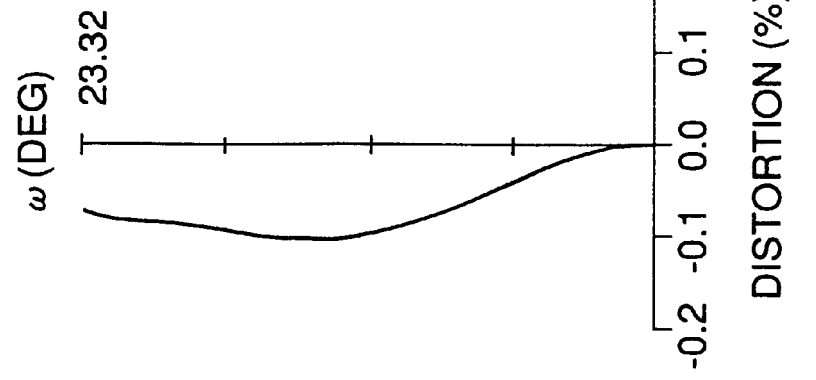
FIGS. 12A to 12C are diagrams showing the aberrations observed in the third embodiment, in the shortest focal length condition [S]
Figure 12B:
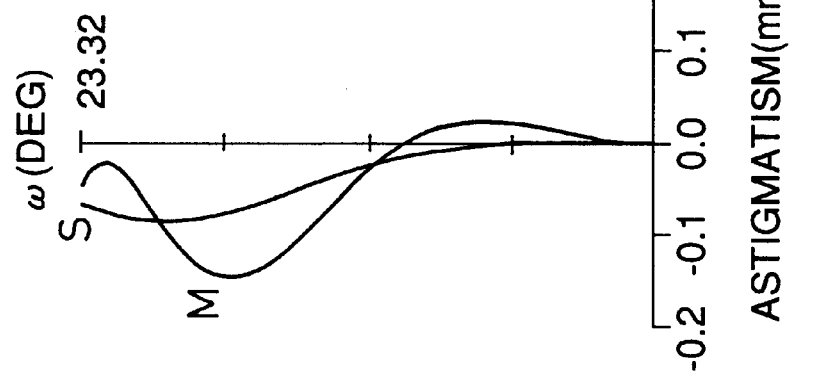
Figure 12A:
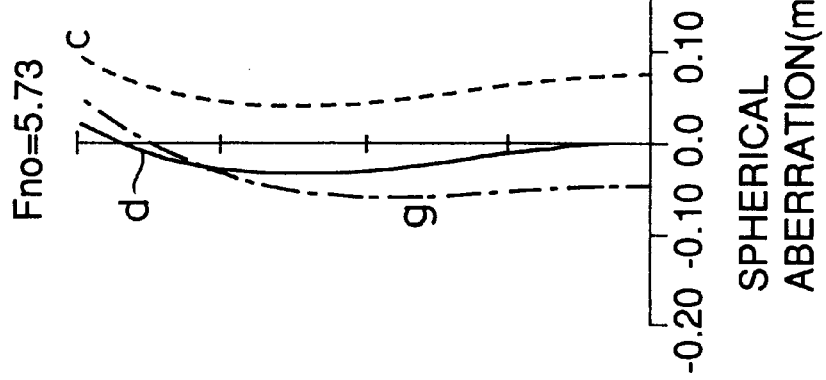
Figure 13C:
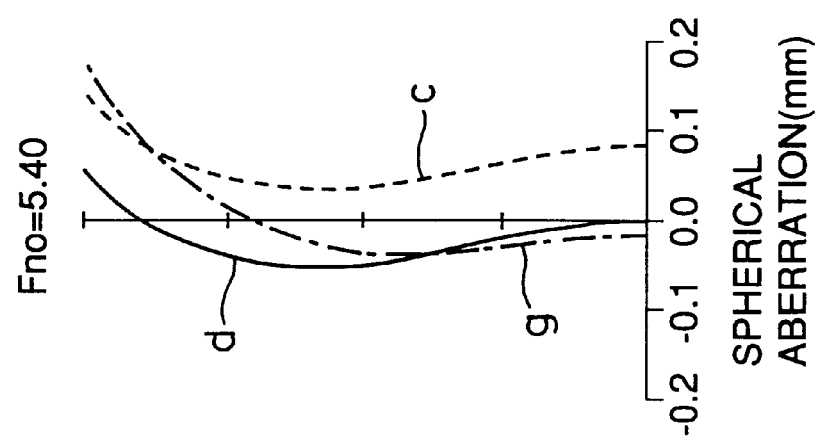
FIGS. 13A to 13C are diagrams showing the aberrations observed in the third embodiment, in the middle focal length condition [M]
Figure 13B:
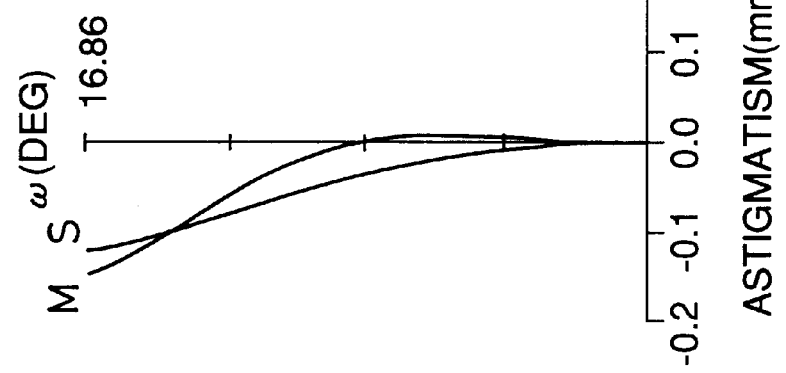
Figure 13A:
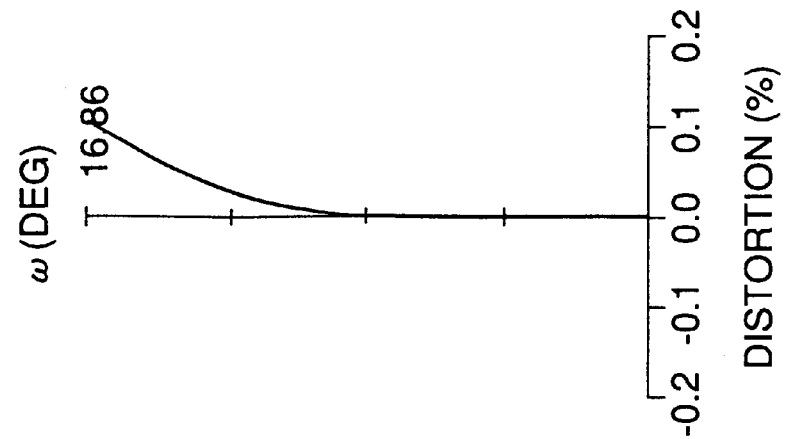
Figure 14A:
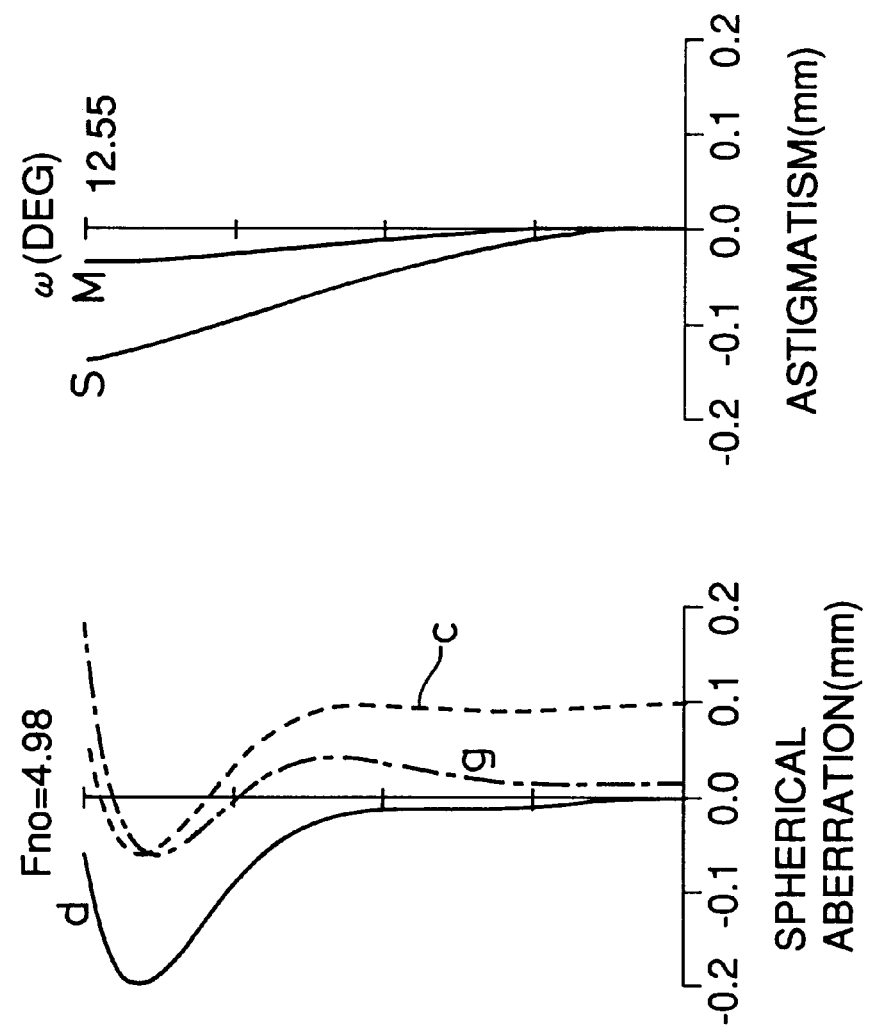
FIGS. 14A to 14C are diagrams showing the aberrations observed in the third embodiment, in the longest focal length condition [L]
Figure 14B:
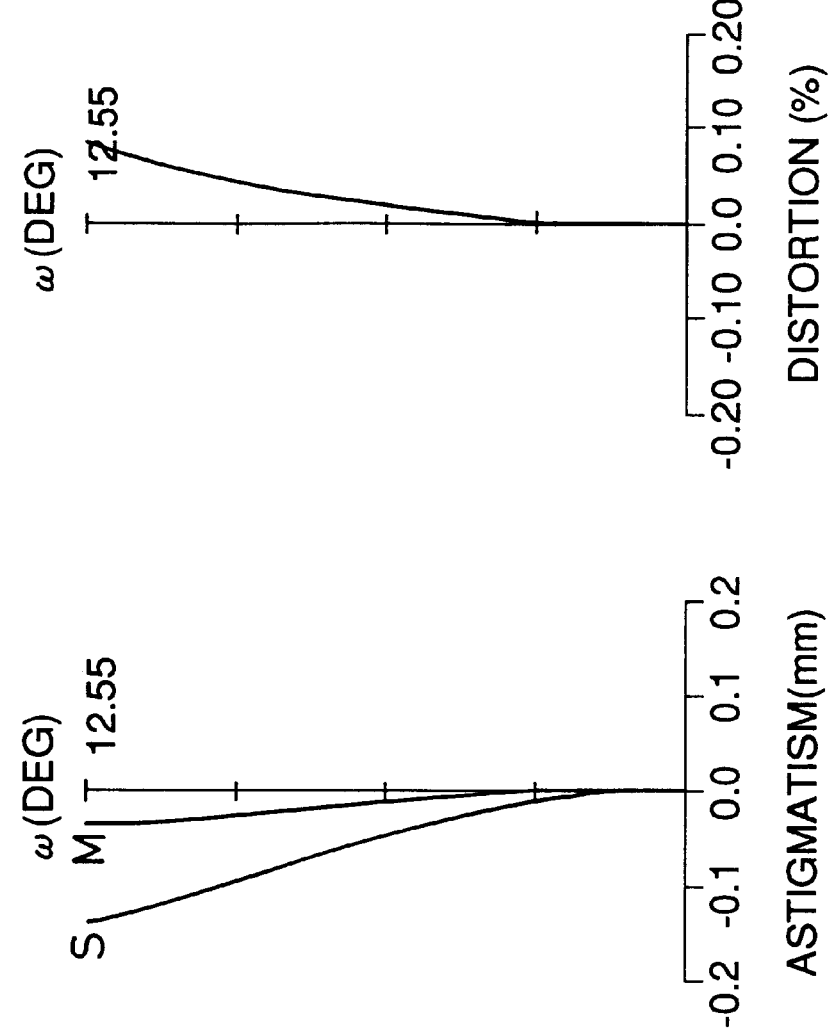
Figure 14C:
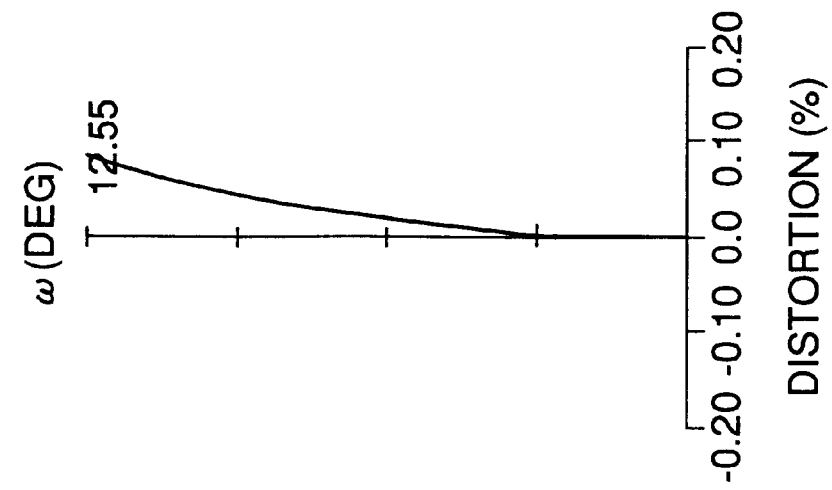
Figure 15C:
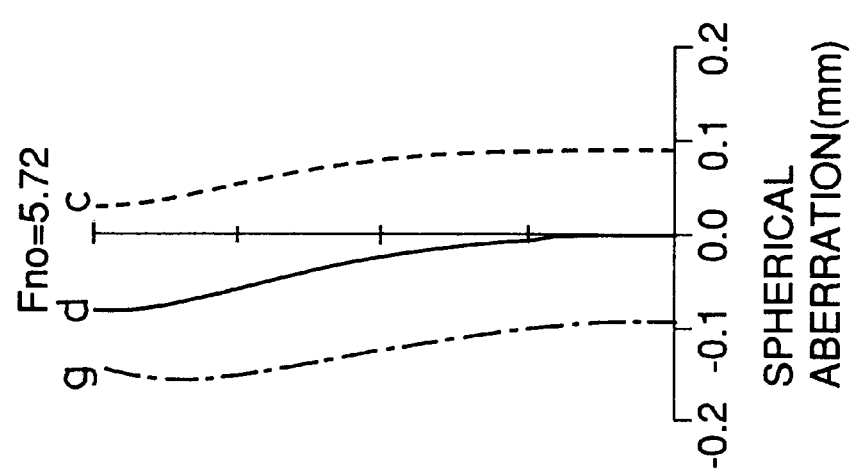
FIGS. 15A to 15C are diagrams showing the aberrations observed in the fourth embodiment, in the shortest focal length condition [S]
Figure 15B:
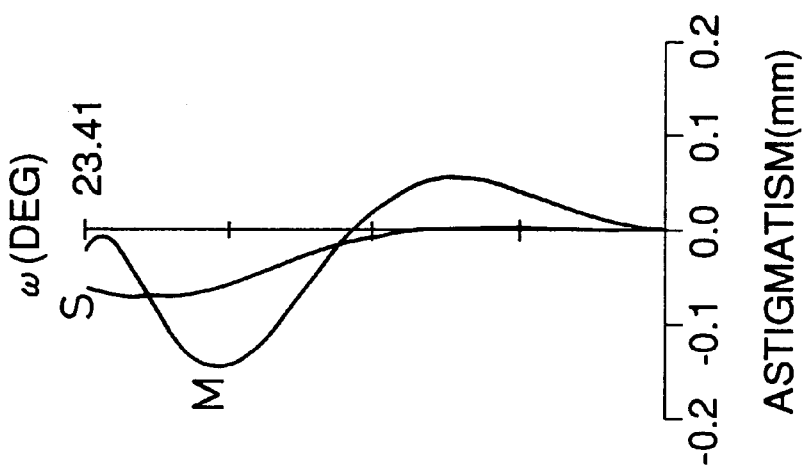
Figure 15A:
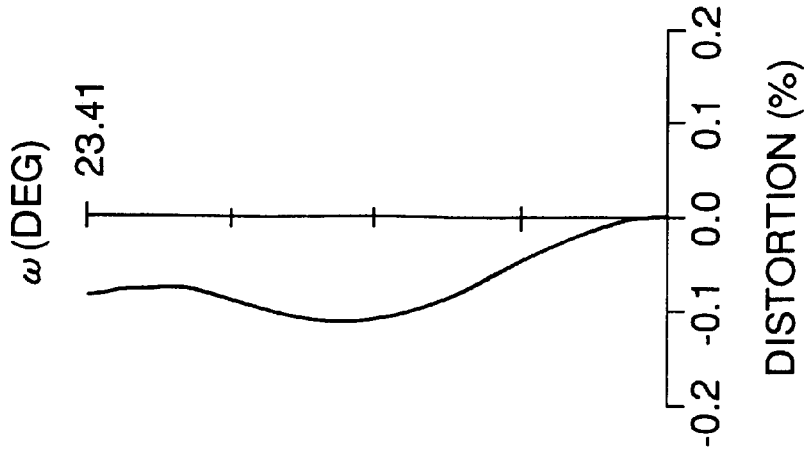
Figure 19A:
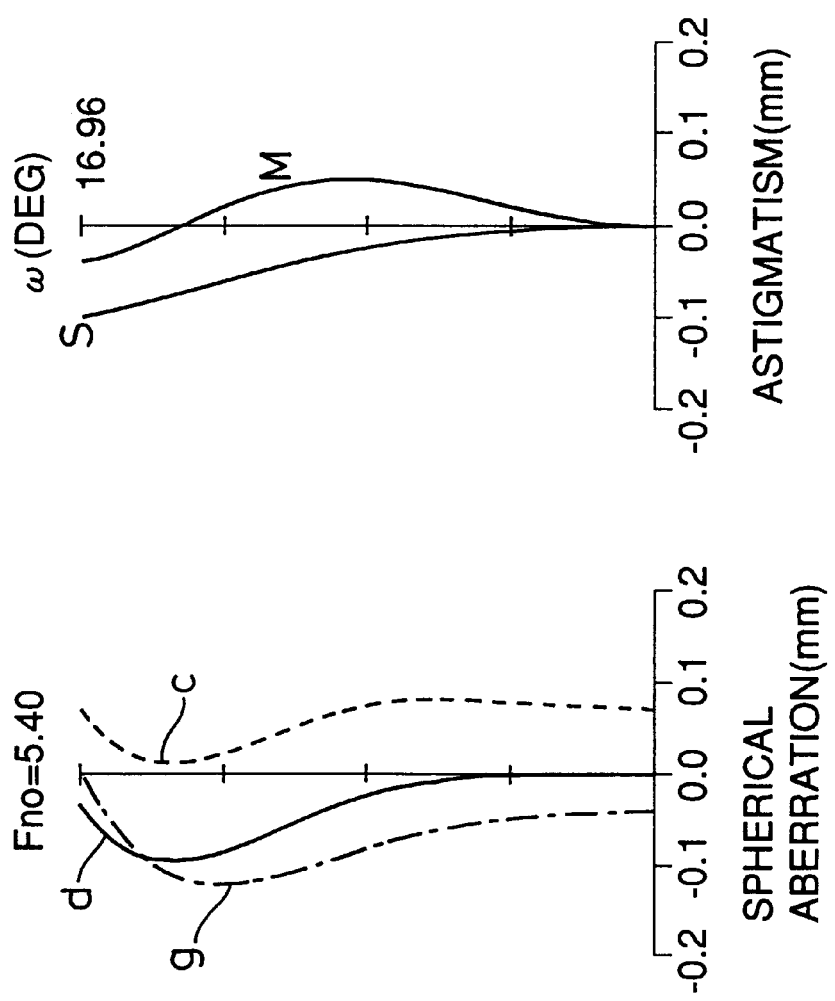
FIGS. 19A to 19C are diagrams showing the aberrations observed in the fifth embodiment, in the middle focal length condition [M]
Figure 19B:
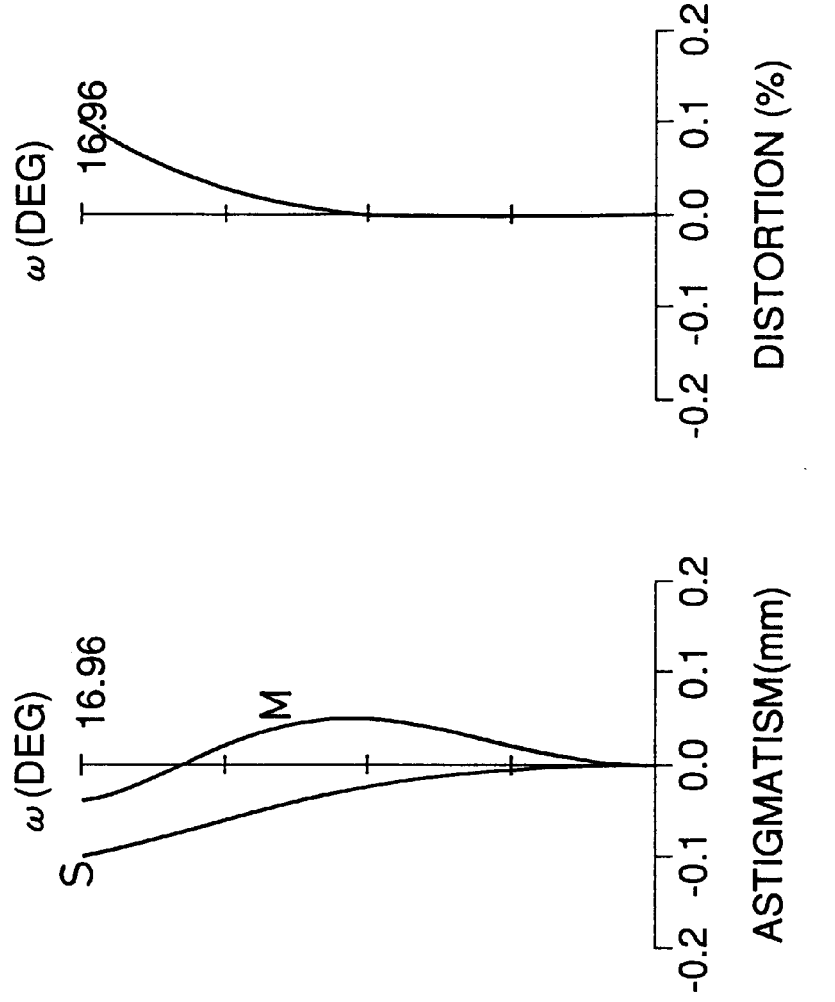
Figure 19C:
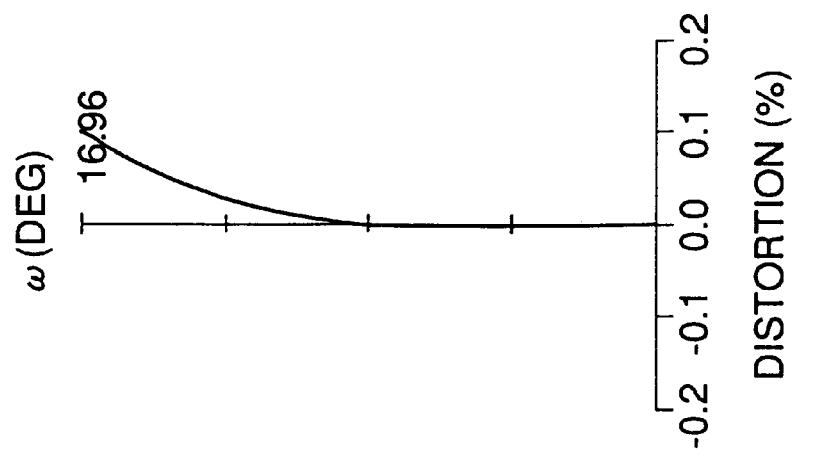

FIGS. 6A to 6C, 7A to 7C, and 8A to 8C show the aberrations observed in the example of the first embodiment; FIGS. 9A to 9C, 10A to 10C, and 11A to 11C show the aberrations observed in the example of the second embodiment; FIGS. 12A to 12C, 13A to 13C, and 14A to 14C show the aberrations observed in the example of the third embodiment; FIGS. 15A to 15C, 16A to 16C, and 17A to 17C show the aberrations observed in the example of the fourth embodiment; FIGS. 18A to 18C, 19A to 19C, and 20A to 20C show the aberrations observed in the example of the fifth embodiment. Of these aberration diagrams, FIGS. 6A to 6C, 9A to 9C, 12A to 12C, 15A to 15C, and 18A to 18C show the aberrations observed in the shortest focal length condition [S], FIGS. 7A to 7C, 10A to 10C, 13A to 13C, 16A to 16C, and 19A to 19C show the aberrations observed in the middle focal length condition [M]. and FIGS. 8A to 8C, 11A to 11C, 14A to 14C, 17A to 17C, and 20A to 20C show the aberrations observed in the longest focal length condition [L]: FIGS. 6A, 7A, 8A, 9A, 10A, 11A, 12A, 13A, 14A, 15A, 16A, 17A, 18A, 19A, and 20A show spherical aberration, FIGS. 6B, 7B, 8B, 9B, 10B, 11B, 12B, 13B, 14B, 15B, 16B, 17B, 18B, 19B, and 20B show astigmatism, and FIGS. 6C, 7C, 8C, 9C, 10C, 11C, 12C, 13C, 14C, 15C, 16C, 17C, 18C, 19C, and 20C show distortion. In the diagrams of spherical aberration, the solid line represents the aberration for d-line, the broken line represents the aberration for c-line, and the dash-dot line represents the aberration for g-line; in the diagrams of astigmatism, the solid line M represents the astigmatism on the meridional plane, and the solid line S represents the astigmatism on the sagittal plane. In the diagrams of astigmatism (in millimeters) and those of distortion (in percent), the vertical axis represents half the angle of view $\omega$ (in degrees).

As described heretofore, according to the present invention, it is possible to realize a compact high-resolution zoom lens system that corrects chromatic and other aberrations satisfactorily by use of a surface having an optical power of diffraction even when its two, negative and positive, constituent lens units are composed of as few as five lens elements in total. In other words, it is possible to minimize the number of lens elements required in each lens unit while keeping high optical performance required for color image reading. This contributes to miniaturization and cost reduction of image-copying and image-reading apparatuses.

TABLE 1

<< Embodiment 1 >>
f = 52.3~70.4~88.6
Fno = 5.80~5.49~5.09

| Radius of Curvature | Axial Distance | Refractive Index | Abbe Number |
|---|---|---|---|
| {First Lens Unit Gr1 . . . Negative} | | | |
| r1* = 193.11 | | | |
| | d1 = 2.64 | N1 = 1.6200 | ν1 = 60.3 |
| r2 = 31.04 | | | |
| | d2 = 19.92 | | |
| r3*(HOE) = 54.83 | | | |
| | d3 = 7.00 | N2 = 1.6630 | ν2 = 32.6 |
| r4* = 91.72 | | | |
| | d4 = 54.36~ 22.72~3.98 | | |
| {Second Lens Unit Gr2 . . . Positive} | | | |
| r5* = 22.97 | | | |
| | d5 = 4.91 | N3 = 1.5731 | ν3 = 56.8 |
| r6 = −222.50 | | | |
| | d6 = 2.75 | | |
| r7 = ∞ (Aperture Diaphragm A) | | | |
| | d7 = 0.10 | | |
| r8 = 58.74 | | | |
| | d8 = 2.50 | N4 = 1.7539 | ν4 = 28.7 |
| r9* = 23.55 | | | |
| | d9 = 8.82 | | |
| r10* = −23.87 | | | |
| | d10 = 7.00 | N5 = 1.4870 | ν5 = 70.4 |
| r11*(HOE) = −20.88 | | | |

[Aspherical Coefficient of Surface r1]

A1 = 0.19077 × 10⁻⁵,   A2 = −0.18524 × 10⁻⁹
A3 = −0.22784 × 10⁻¹¹,   A4 = 0.24519 × 14

[Aspherical Coefficient of Surface r3]

A1 = −0.50278 × 10⁻⁶,   A2 = 0.25326 × 10⁻⁸

[Aspherical Coefficient of Surface r4]

A1 = −0.54379 × 10⁻⁶,   A2 = 0.16000 × 10⁻⁸
A3 = −0.24850 × 10⁻¹¹,   A4 = 0.40637 × 14

[Aspherical Coefficient of Surface r5]

A1 = −0.22442 × 10⁻⁵,   A2 = −0.11951 × −7
A3 = −0.10172 × 10⁻¹⁰,   A4 = −0.10053 × 10⁻¹²

TABLE 1-continued

[Aspherical Coefficient of Surface r9]

$A1 = 0.12028 \times 10^{-4}$, $\quad A2 = 0.19792 \times 10^{-7}$
$A3 = 0.57968 \times 10^{-10}$, $\quad A4 = -0.76131 \times 10^{-13}$

[Aspherical Coefficient of Surface r10]

$A1 = -0.24448 \times 10^{-5}$, $\quad A2 = 0.75555 \times 10^{-8}$
$A3 = -0.43521 \times 10^{-10}$, $\quad A4 = 0.54974 \times 10^{-12}$

[Aspherical Coefficient of Surface r11]

$A1 = 0.22152 \times 10^{-5}$, $\quad A2 = 0.44505 \times 10^{-8}$

[Phase Function Coefficient of Surface r3]

$B1 = 1.0258 \times 10^{-5}$, $\quad B2 = -1.2763 \times 10^{-8}$
$B3 = -1.3002 \times 10^{-10}$

[Phase Function Coefficient of Surface r11]

$B1 = -1.5720 \times 10^{-4}$, $\quad B2 = 1.3906 \times 10^{-7}$
$B3 = -1.0420 \times 10^{-10}$

TABLE 2

<< Embodiment 2 >>
f = 52.6~70.7~88.8
Fno = 5.74~5.41~5.00

| Radius of Curvature | Axial Distance | Refractive Index | Abbe Number |
|---|---|---|---|
| {First Lens Unit Gr1 . . . Negative} | | | |
| r1* = 834.56 | | | |
| | d1 = 5.51 | N1 = 1.6465 | ν1 = 55.5 |
| r2 = 37.03 | | | |
| | d2 = 21.64 | | |
| r3* = 63.87 | | | |
| | d3 = 7.00 | N2 = 1.7521 | ν2 = 30.6 |
| r4* = 110.18 | | | |
| | d4 = 50.51~ 18.86~0.10 | | |
| {Second Lens Unit Gr2 . . . Positive} | | | |
| r5* = 24.24 | | | |
| | d5 = 6.53 | N3 = 1.5773 | ν3 = 62.7 |
| r6 = -197.82 | | | |
| | d6 = 5.02 | | |
| r7 = ∞ (Aperture Diaphragm A) | | | |
| | d7 = 0.10 | | |
| r8 = 87.41 | | | |
| | d8 = 2.50 | N4 = 1.7550 | ν4 = 27.6 |
| r9* = 27.11 | | | |
| | d9 = 4.19 | | |
| r10* = -25.78 | | | |
| | d10 = 7.00 | N5 = 1.4914 | ν5 = 57.8 |
| r11*(HOF) = -21.76 | | | |

[Aspherical Coefficient of Surface r1]

$A1 = 0.16167 \times 10^{-5}$, $\quad A2 = -0.28926 \times 10^{-9}$
$A3 = -0.14814 \times 10^{-11}$, $\quad A4 = 0.19112 \times 10^{-14}$

[Aspherical Coefficient of Surface r3]

$A1 = -0.10283 \times 10^{-5}$, $\quad A2 = 0.20289 \times 10^{-8}$
$A3 = -0.57797 \times 10^{-12}$, $\quad A4 = -0.15260 \times 10^{-13}$

[Aspherical Coefficient of Surface r4]

$A1 = -0.89634 \times 10^{-6}$, $\quad A2 = 0.26372 \times 10^{-8}$
$A3 = -0.85217 \times 10^{-11}$, $\quad A4 = -0.64160 \times 10^{-14}$

[Aspherical Coefficient of Surface r5]

$A1 = -0.28087 \times 10^{-5}$, $\quad A2 = -0.83439 \times 10^{-8}$
$A3 = -0.25667 \times 10^{-11}$, $\quad A4 = -0.63915 \times 10^{-13}$

[Aspherical Coefficient of Surface r9]

$A1 = 0.11657 \times 10^{-4}$, $\quad A2 = 0.14268 \times 10^{-7}$

TABLE 2-continued $A3 = -0.90364 \times 10^{-11}$, $\quad A4 = 0.27913 \times 10^{-12}$

[Aspherical Coefficient of Surface r10]

$A1 = -0.86191 \times 10^{-5}$, $\quad A2 = -0.31946 \times 10^{-7}$
$A3 = -0.18753 \times 10^{-10}$, $\quad A4 = 0.27253 \times 10^{-12}$

[Aspherical Coefficient of Surface r11]

$A1 = -0.15793 \times 10^{-5}$, $\quad A2 = -0.10980 \times 10^{-7}$

[Phase Function Coefficient of Surface r11]

$B1 = -8.9574 \times 10^{-5}$

TABLE 3

<< Embodiment 3 >>
f = 52.7~70.8~88.9
Fno = 5.73~5.40~4.98

| Radius of Curvature | Axial Distance | Refractive Index | Abbe Number |
|---|---|---|---|
| {First Lens Unit Gr1 . . . Negative} | | | |
| r1* = 333.14 | | | |
| | d1 = 3.29 | N1 = 1.6465 | ν1 = 55.5 |
| r2 = 36.39 | | | |
| | d2 = 22.80 | | |
| r3(HOE) = 58.22 | | | |
| | d3 = 7.00 | N2 = 1.7521 | ν2 = 30.6 |
| r4* = 88.44 | | | |
| | d4 = 52.34~ 20.42~1.50 | | |
| {Second Lens Unit Gr2 . . . Positive) | | | |
| r5* = 22.54 | | | |
| | d5 = 7.00 | N3 = 1.5773 | ν3 = 62.7 |
| r6 = -336.12 | | | |
| | d6 = 3.72 | | |
| r7 = ∞ (Aperture Diaphragm A) | | | |
| | d7 = 0.10 | | |
| r8 = 56.40 | | | |
| | d8 = 2.50 | N4 = 1.7550 | ν4 = 27.6 |
| r9* = 23.29 | | | |
| | d9 = 4.26 | | |
| r10*(HOE) = -29.00 | | | |
| | d10 = 7.00 | N5 = 1.5348 | ν5 = 52.8 |
| r11* = 25.78 | | | |

[Aspherical Coefficient of Surface r1]

$A1 = 0.14038 \times 10^{-5}$, $\quad A2 = 0.13574 \times 10^{-9}$
$A3 = -0.17083 \times 10^{-11}$, $\quad A4 = 0.16432 \times 10^{-14}$

[Aspherical Coefficient of Surface r4]

$A1 = 0.19552 \times 10^{-6}$, $\quad A2 = -0.49994 \times 10^{-9}$
$A3 = -0.21932 \times 10^{-11}$, $\quad A4 = 0.44611 \times 10^{-14}$

[Aspherical Coefficient of Surface r5]

$A1 = -0.31697 \times 10^{-5}$, $\quad A2 = -0.98149 \times 10^{-8}$
$A3 = 0.32626 \times 10^{-11}$, $\quad A4 = -0.11105 \times 10^{-12}$

[Aspherical Coefficient of Surface r9]

$A1 = 0.11398 \times 10^{-4}$, $\quad A2 = 0.32299 \times 10^{-7}$
$A3 = 0.12384 \times 10^{-9}$, $\quad A4 = 0.19548 \times 10^{-13}$

[Aspherical Coefficient of Surface r10]

$A1 = -0.37706 \times 10^{-5}$, $\quad A2 = 0.23550 \times 10^{-7}$

[Aspherical Coefficient of Surface r11]

$A1 = 0.24961 \times 10^{-6}$, $\quad A2 = 0.82211 \times 10^{-8}$
$A3 = -0.29921 \times 10^{-10}$, $\quad A4 = -0.14574 \times 10^{-12}$

[Phase Function Coefficient of Surface r3]

$B1 = 2.2420 \times 10^{-5}$

TABLE 3-continued

[Phase Function Coefficient of Surface r10]

$B1 = -1.3525 \times 10^{-4}$

TABLE 4

<< Embodiment 4 >>
$f = 52.5 \sim 70.3 \sim 88.2$
$Fno = 5.72 \sim 5.40 \sim 4.99$

| Radius of Curvature | Axial Distance | Refractive Index | Abbe Number |
|---|---|---|---|
| {First Lens Unit Gr1 ... Negative} | | | |
| r1* = 333.14 | | | |
| | d1 = 7.00 | N1 = 1.6465 | ν1 = 55.5 |
| r2 = 37.43 | | | |
| | d2 = 22.72 | | |
| r3* = 73.95 | | | |
| | d3 = 7.00 | N2 = 1.7521 | ν2 = 30.6 |
| r4* = 147.80 | | | |
| | d4 = 46.46~17.48~0.10 | | |
| {Second Lens Unit Gr2 ... Positive} | | | |
| r5* = 24.47 | | | |
| | d5 = 6.40 | N3 = 1.5773 | ν3 = 62.7 |
| r6*(HOE) = −422.16 | | | |
| | d6 = 7.79 | | |
| r7 = ∞ (Aperture Diaphragm A) | | | |
| | d7 = 0.10 | | |
| r8 = 332.23 | | | |
| | d8 = 2.50 | N4 = 1.7550 | ν4 = 27.6 |
| r9* = 32.77 | | | |
| | d9 = 3.03 | | |
| r10* = −44.06 | | | |
| | d10 = 7.00 | N5 = 1.5348 | ν5 = 52.8 |
| r11* = −27.25 | | | |

[Aspherical Coefficient of Surface r1]
$A1 = 0.18021 \times 10^{-5}$, $A2 = 0.62592 \times 10^{-10}$
$A3 = -0.24606 \times 10^{-11}$, $A4 = 0.23991 \times 10^{-14}$

[Aspherical Coefficient of Surface r3]
$A1 = -0.18742 \times 10^{-5}$, $A2 = 0.13333 \times 10^{-8}$
$A3 = 0.74561 \times 10^{-12}$, $A4 = -0.11512 \times 10^{-13}$

[Aspherical Coefficient of Surface r4]
$A1 = -0.17743 \times 10^{-5}$, $A2 = 0.20373 \times 10^{-8}$
$A3 = -0.65604 \times 10^{-11}$, $A4 = -0.29096 \times 10^{-14}$

[Aspherical Coefficient of Surface r5]
$A1 = 0.37659 \times 10^{-6}$, $A2 = 0.53809 \times 10^{-8}$
$A3 = -0.11716 \times 10^{-10}$, $A4 = 0.11276 \times 10^{-12}$

[Aspherical Coefficient of Surface r6]
$A1 = 0.50674 \times 10^{-5}$, $A2 = 0.51739 \times 10^{-8}$

[Aspherical Coefficient of Surface r9]
$A1 = 0.10614 \times 10^{-4}$, $A2 = 0.11790 \times 10^{-7}$
$A3 = -0.13560 \times 10^{-9}$, $A4 = 0.16986 \times 10^{-11}$

[Aspherical Coefficient of Surface r10]
$A1 = -0.65020 \times 10^{-5}$, $A2 = -0.71499 \times 10^{-7}$
$A3 = 0.37272 \times 10^{-10}$, $A4 = -0.54815 \times 10^{-12}$

[Aspherical Coefficient of Surface r11]
$A1 = -0.32096 \times 10^{-5}$, $A2 = -0.31076 \times 10^{-7}$
$A3 = 0.71030 \times 10^{-10}$, $A4 = -0.60033 \times 10^{-12}$

[Phase Function Coefficient of Surface r6]
$B1 = -0.73626 \times 10^{-4}$, $B2 = 0.26775 \times 10^{-6}$
$B3 = -0.19883 \times 10^{-8}$, $B4 = 0.52526 \times 10^{-11}$

TABLE 5

<< Embodiment 5 >>
$f = 53.4 \sim 70.5 \sim 88.0$
$Fno = 5.70 \sim 5.40 \sim 5.00$

| Radius of Curvature | Axial Distance | Refractive Index | Abbe Number |
|---|---|---|---|
| {First Lens Unit Gr1 ... Negative} | | | |
| r1* = 190.45 | | | |
| | d1 = 2.50 | N1 = 1.6465 | ν1 = 55.5 |
| r2 = 28.15 | | | |
| | d2 = 21.30 | | |
| r3* = 88.57 | | | |
| | d3 = 7.00 | N2 = 1.7521 | μ2 = 30.6 |
| r4*(HOE) = 212.32 | | | |
| | d4 = 36.22~14.66~1.29 | | |
| {Second Lens Unit Gr2 ... Positive} | | | |
| r5* = 24.65 | | | |
| | d5 = 6.92 | N3 = 1.5773 | ν3 = 62.7 |
| r6*(HOE) = −10091.24 | | | |
| | d6 = 8.90 | | |
| r7 = ∞ (Aperture Diaphragm A) | | | |
| | d7 = 0.10 | | |
| r8 = −511.56 | | | |
| | d8 = 2.50 | N4 = 1.7550 | ν4 = 27.6 |
| r9* = 41.90 | | | |
| | d9 = 2.50 | | |
| r10* = −62.45 | | | |
| | d10 = 7.00 | NS = 1.5348 | ν5 = 52.8 |
| r11* = −29.39 | | | |

[Aspherical Coefficient of Surface r1]
$A1 = 0.22533 \times 10^{-5}$, $A2 = -0.20399 \times 10^{-9}$
$A3 = -0.40879 \times 10^{-11}$, $A4 = 0.43439 \times 10^{-14}$

[Aspherical Coefficient of Surface r3]
$A1 = -0.12452 \times 10^{-5}$, $A2 = 0.30468 \times 10^{-8}$
$A3 = 0.10606 \times 10^{-10}$, $A4 = -0.50086 \times 10^{-14}$

[Aspherical Coefficient of Surface r4]
$A1 = -0.19382 \times 10^{-5}$, $A2 = 0.22509 \times 10^{-8}$
$A3 = 0.69643 \times 10^{-11}$

[Aspherical Coefficient of Surface r5]
$A1 = 0.12971 \times 10^{-5}$, $A2 = 0.61488 \times 10^{-8}$
$A3 = -0.97054 \times 10^{-11}$, $A4 = 0.10659 \times 10^{-12}$

[Aspherical Coefficient of Surface r6]
$A1 = 0.52727 \times 10^{-5}$, $A2 = 0.47707 \times 10^{-8}$

[Aspherical Coefficient of Surface r9]
$A1 = 0.10992 \times 10^{-4}$, $A2 = 0.15440 \times 10^{-7}$
$A3 = -0.89188 \times 10^{-10}$, $A4 = 0.15634 \times 10^{-11}$

[Aspherical Coefficient of Surface r10]
$A1 = -0.78789 \; 10^{-5}$, $A2 = -0.63244 \times 10^{-7}$
$A3 = 0.68784 \times 10^{-10}$, $A4 = -0.61473 \times 10^{-12}$

[Aspherical Coefficient of Surface r11]
$A1 = -0.39588 \times 10^{-5}$, $A2 = -0.34847 \times 10^{-7}$
$A3 = 0.11600 \times 10^{-9}$, $A4 = -0.95601 \times 10^{-12}$

[Phase Function Coefficient of Surface r4]
$B1 = 6.3663 \times 10^{-5}$, $B2 = -1.3828 \times 10^{-7}$
$B3 = 1.6382 \times 10^{-10}$, $B4 = -8.8514 \times 10^{-13}$

[Phase Function Coefficient of Surface r6]
$B1 = -1.4052 \times 10^{-4}$, $B2 = 3.8634 \times -7$
$B3 = -2.0246 \times 10^{-9}$, $B4 = 5.3054 \times 10^{-12}$

TABLE 6

| | Embod. 1 | Embod. 2 | Embod. 3 | Embod. 4 | Embod. 5 |
|---|---|---|---|---|---|
| Condition (1) $\|\phi Dn/\phi n\|$ | 0.0021 | — | 0.0046 | — | 0.0085 |
| Condition (2) $\|\phi Dn/\phi 1\|$ | 0.0040 | — | 0.00093 | — | 0.0250 |
| Condition (3) $\phi Dp/\phi p$ | 0.0207 | 0.0116 | 0.0175 | 0.0138 | 0.0159 |
| Condition (4) $\phi Dp/\phi 2$ | 0.0609 | 0.0323 | 0.0669 | 0.0059 | 0.0120 |
| Condition (5) $\phi p \cdot rL$ | −0.317 | −0.336 | −0.400 | −0.475 | −0.519 |
| Condition (6) $\phi n/\phi p$ | −0.677 | −0.643 | −0.629 | −0.612 | −0.850 |

What is claimed is:

1. A zoom lens system, comprising, in order from an enlargement side to a reduction side:

a first lens unit having a negative optical power; and a second lens unit having a positive optical power, wherein said first lens unit has a surface having an optical power of diffraction and wherein said zoom lens system fulfills the following conditions:

$$0.001 < |\phi Dn/\phi n| < 0.15$$

where $\phi Dn$ represents the optical power of diffraction of the surface included in said first lens unit; and $\phi n$ represents a composite optical power of refraction of all surfaces included in said first lens unit.

2. A zoom lens system, comprising, in order from an enlargement side to a reduction side:

a first lens unit having a negative optical power; and a second lens unit having a positive optical power, wherein said first lens unit has a surface having an optical power of diffraction and wherein said zoom lens system fulfills the following conditions:

$$|\phi Dn/\phi 1| < 0.07$$

where $\phi Dn$ represents the optical power of diffraction of the surface included in said first lens unit; and $\phi 1$ represents a composite optical power of refraction and diffraction of the lens element which has the surface having an optical power of diffraction and which is included in said first lens unit.

3. A zoom lens system, comprising, in order from an enlargement side to a reduction side:

a first lens unit having a negative optical power; and a second lens unit having a positive optical power, wherein said second lens unit has a surface having an optical power of diffraction and wherein said zoom lens system fulfills the following conditions:

$$0.01 < \phi Dp/\phi p < 0.025$$

where $\phi Dp$ represents the optical power of diffraction of the surface included in said second lens unit; and $\phi p$ represents a composite optical power of refraction of all surfaces included in said second lens unit.

4. A zoom lens system, comprising, in order from an enlargement side to a reduction side:

a first lens unit having a negative optical power; and a second lens unit having a positive optical power, wherein said second lens unit has a surface having an optical power of diffraction and wherein said zoom lens system fulfills the following conditions:

$$0.005 < \phi Dp/\phi 2 < 0.08$$

where $\phi Dp$ represents the optical power of diffraction of the surface included in said second lens unit; and $\phi 2$ represents a composite optical power of refraction and diffraction of the lens element which has the surface having an optical power of diffraction and which is included in said second lens unit.

5. A zoom lens system, comprising, in order from an enlargement side to a reduction side:

a first lens unit having a negative optical power; and a second lens unit having a positive optical power.

wherein either said first or second lens unit has at least one surface having an optical power of diffraction and wherein said zoom lens system fulfills the following condition:

$$-1 < \phi n/\phi p < -0.5$$

where $\phi n$ represents a composite optical power of refraction of all surfaces included in said first lens unit; and $\phi p$ represents a composite optical power of refraction of all surfaces included in said second lens unit.

* * * * *